United States Patent
Gadde et al.

(10) Patent No.: US 12,464,239 B2
(45) Date of Patent: Nov. 4, 2025

(54) FULL FRAME MEDIA STABILIZATION IN ELECTRONIC DEVICES

(71) Applicant: SAMSUNG ELECTRONICS CO., LTD., Suwon-si (KR)

(72) Inventors: Raj Narayana Gadde, Bengaluru (IN); Sarvesh, Bengaluru (IN); Yathish Reddy, Bengaluru (IN); Addanki Sankara Rao, Bengaluru (IN); Pravin Ramachandran Nair, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 12 days.

(21) Appl. No.: 18/434,056

(22) Filed: Feb. 6, 2024

(65) Prior Publication Data

US 2024/0267624 A1  Aug. 8, 2024

Related U.S. Application Data

(63) Continuation of application No. PCT/KR2024/001073, filed on Jan. 23, 2024.

(30) Foreign Application Priority Data

Feb. 7, 2023  (IN) .............................. 202341007888
Jul. 27, 2023  (IN) .............................. 202341007888

(51) Int. Cl.
*H04N 23/68* (2023.01)
*H04N 5/262* (2006.01)
(Continued)

(52) U.S. Cl.
CPC ......... *H04N 23/683* (2023.01); *H04N 5/2628* (2013.01); *H04N 23/65* (2023.01);
(Continued)

(58) Field of Classification Search
CPC ............... H04N 23/65; H04N 23/6811; H04N 23/6812; H04N 23/683; H04N 23/81; H04N 5/2628
See application file for complete search history.

(56) References Cited

U.S. PATENT DOCUMENTS 9,674,440 B2   6/2017  Karpenko
11,258,999 B2 * 2/2022  Rao Padebettu .... H04N 13/344
(Continued)

FOREIGN PATENT DOCUMENTS

| KR | 10-0677913 B1 | 2/2007 |
| KR | 10-0964951 B1 | 6/2010 |
| KR | 10-2021-0115185 A | 9/2021 |

OTHER PUBLICATIONS

Translation of International Search Report dated Apr. 25, 2024, issued by the International Searching Authority in International Application No. PCT/KR2024/001073.
(Continued)

*Primary Examiner* — Antoinette T Spinks
(74) *Attorney, Agent, or Firm* — Sughrue Mion, PLLC

(57) ABSTRACT

A method may comprise detecting at least one motion of the electronic device while capturing a plurality of media frames, determining a type of the at least one motion of the electronic device while capturing the plurality of media frames, determining a variation in the type of the at least one motion of the electronic device over a pre-determined period of time, selecting at least one stabilization procedure from a plurality of stabilization procedures and a frame fusion procedure from a plurality of frame fusion procedures based on the type of the at least one motion of the electronic device and the variation in the type of the at least one motion of the electronic device, and stabilizing, after the capturing of the plurality of media frames, the plurality of media frames
(Continued)

based on the at least one selected stabilization procedure and the selected frame fusion procedure.

20 Claims, 19 Drawing Sheets

(51) Int. Cl.
*H04N 23/65* (2023.01)
*H04N 23/81* (2023.01)

(52) U.S. Cl.
CPC ..... *H04N 23/6811* (2023.01); *H04N 23/6812* (2023.01); *H04N 23/81* (2023.01)

(56) References Cited

U.S. PATENT DOCUMENTS

| | | |
|---|---|---|
| 12,335,146 B2 * | 6/2025 | Sivakumar .......... H04L 43/0817 |
| 2003/0076408 A1 | 4/2003 | Dutta |
| 2013/0044228 A1 | 2/2013 | Corey et al. |
| 2017/0041545 A1 | 2/2017 | Murgia et al. |
| 2018/0070015 A1 | 3/2018 | Hubel et al. |
| 2018/0338132 A1 * | 11/2018 | Rao Padebettu .... H04N 13/344 |

OTHER PUBLICATIONS

Translation of Written Opinion dated Apr. 25, 2024, issued by the International Searching Authority in International Application No. PCT/KR2024/001073.

* cited by examiner

FULL FRAME MEDIA STABILIZATION IN ELECTRONIC DEVICES

CROSS-REFERENCE TO RELATED APPLICATIONS

This application is a by-pass continuation application of International Application NO. PCT/KR2024/001073, filed on Jan. 23, 2024, which is based on and claims priority to Indian Complete patent application No. 202341007888 filed on Jul. 27, 2023, which is based on and claims priority to Indian Provisional Application 202341007888 filed on Feb. 7, 2023, the contents of each of which are incorporated herein by reference.

BACKGROUND

1. Field

The present disclosure is related to electronic devices. More particularly the present disclosure is related to multimedia processing in the electronic devices.

2. Description of the Related Art

In general, media frame stabilization methods generate visually pleasing videos by removing undesirable camera motion. Most media frames on an electronic device are captured in various static and dynamic modes while the electronic device is being held by hand. Therefore, videos are prone to jitters and shaking causing an unpleasant viewing experience. The media frame stabilization methods may include motion estimation, motion smoothing, and motion compensation. In existing methods, media fame inputs and Inertial Measurement Unit (IMU) Sensor readings are used to estimate a camera motion followed by the stabilization methods to smoothen the camera motion path. The motion compensation is applied to accommodate a difference between an original and a smooth path. Finally, the motion compensated media frame is cropped to remove blank regions. The blank regions are created due to motion compensation. Since, video stabilization is an integral part of a camera pipeline in smartphones, poorer stabilization and excessive crop may reduce the end user experience.

The existing video stabilization engines use camera motion agnostic parameters to smoothen camera motion. There may be multiple smooth camera paths for a given input camera path. However, choosing an optimal path that results in better video stability is challenging. Most of the existing methods restrict field of view to obtain the stabilized media frames. The restriction in the field of view is constant for a video, leading to loss of important details. For example, a video captured in a static scenario may be stabilized with 5-10% restriction in the field of view, while dynamic videos need 20-30%. Thus, it is desired to address the above-mentioned disadvantages and other shortcomings in stabilization methods with a useful alternative.

SUMMARY

According to an embodiment of the disclosure, a method for full frame media stabilization may comprise detecting at least one motion of the electronic device while capturing a plurality of media frames.

In an embodiment, the method may comprise determining a type of the at least one motion of the electronic device while capturing the plurality of media frames.

In an embodiment, the method may comprise determining a variation in the type of the at least one motion of the electronic device over a pre-determined period of time.

In an embodiment, the method may comprise selecting at least one stabilization procedure from a plurality of stabilization procedures and a frame fusion procedure from a plurality of frame fusion procedures based on the type of the at least one motion of the electronic device and the variation in the type of the at least one motion of the electronic device.

In an embodiment, the method may comprise stabilizing, after the capturing of the plurality of media frames, the plurality of media frames based on the at least one selected stabilization procedure from the plurality of stabilization procedures and the selected frame fusion procedure from the plurality of frame fusion procedures.

According to an embodiment of the disclosure, an electronic device for full frame media stabilization may comprise a memory, at least one processor, a motion sensor configured to detect at least one motion of the electronic device while capturing a plurality of media frames, and at least one image sensor configured to capture the plurality of media frames.

In an embodiment, the at least one processor may determine a type of the at least one motion of the electronic device while capturing the plurality of media frames.

In an embodiment, the at least one processor may determine a variation in the type of the at least one motion of the electronic device over a pre-determined period of time.

In an embodiment, the at least one processor may select at least one stabilization procedure from a plurality of stabilization procedures and a frame fusion procedure from a plurality of frame fusion procedures based on the type of the at least one motion of the electronic device and the variation in the type of the at least one motion of the electronic device.

In an embodiment, the at least one processor may stabilize, after the capture of the plurality of media frames, the plurality of media frames based on the at least one selected stabilization procedure from the plurality of stabilization procedures and the selected frame fusion procedure from the plurality of frame fusion procedures.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
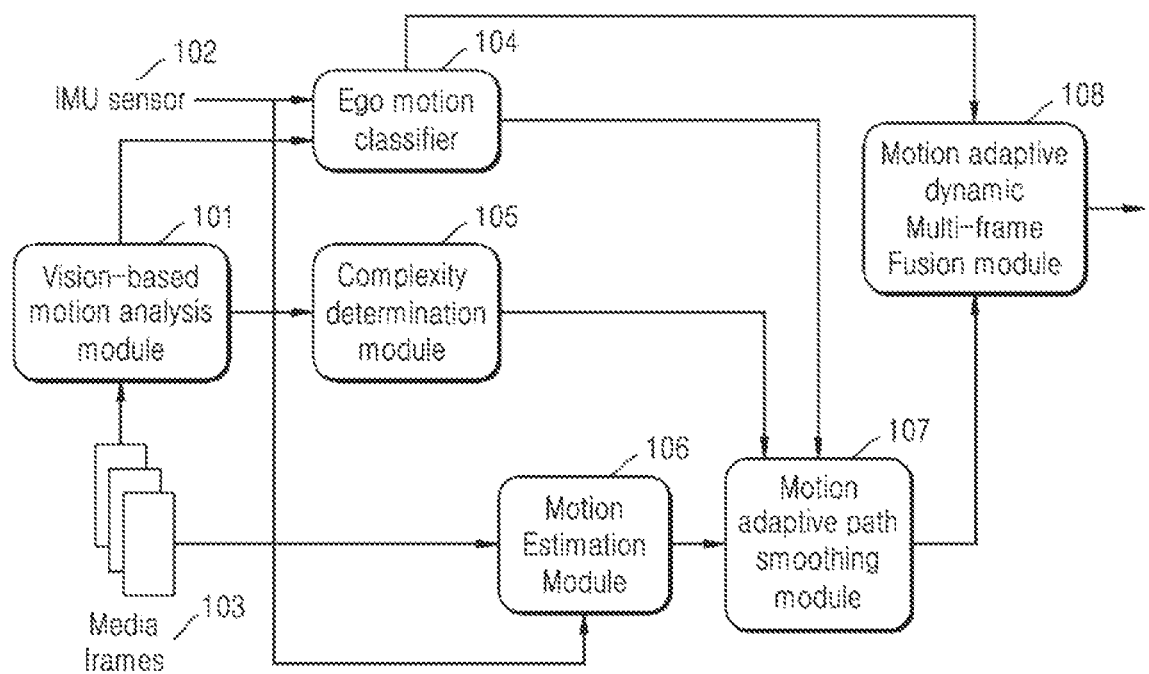
FIG. 1 is a schematic illustrating full frame media stabilization using motion sensor, according to an embodiment of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The principal object of the disclosure is to provide a method for full frame media stabilization in an electronic device based on motion type. The full frame media stabilization enhances the stabilization and excessive crop is reduced.

Another object of the disclosure is to provide a dynamic selection of camera path smoothing based on the motion type of an electronic device.

Another object of the disclosure is to provide the dynamic selection of crop constraints based on the motion type of an electronic device.

Another object of the disclosure is to provide the dynamic selection of frames as well as multi-frame fusion DNN using the motion type of the electronic device to generate the full frame media stabilization.

In an existing method, a motion of an electronic device is estimated using IMU sensors of the electronic device. The estimated motion is smoothened through known methods of ranging from a simple low pass filter to a directed motion flow. The path smoothing method is tuned with hyper parameters to determine additional smoothing. These hyper parameters are critical to performance of media stabilization. For example, one set of parameters may be optimal for hand held static recording and another set may be optimal for hand held recording while walking. Since all motion smoothing methods are not designed to use prior motion information, a common set of hyper parameters are usually used in deployment for providing a balanced performance across video recording scenarios, limiting the performance of video stabilization and stabilization quality is not optimal.

In another conventional system, motion compensation applies a difference in an original camera path and a smoothed camera path to a media frame through frame warping. The motion compensation creates a stable video, but also produces blank regions in output media frames. To address the blank space issue, video is cropped and resized reducing an original field of view of the camera. An amount to be cropped is a hyper parameter in a video stabilization method, and is usually fixed irrespective of camera motion.

In an embodiment of the disclosure, ego motion is enabled to determine type of motion of the media frames for media stabilization. In one or more examples, ego motion may include 3D motion of a camera within an environment. Based on the ego motion classification, hyper parameters of motion path planning module are dynamically selected. Based on the ego motion, crop constraints of the ego motion classification are dynamically determined and generating full frame media stabilized output through dynamic frame fusion. In one or more examples, the hyper parameters may include a number of media frames to be considered, type of method to be used for motion path planning and the like.

In an embodiment, media stabilization methods generate visually pleasing videos/any moving picture by removing undesirable camera motion. Most of the videos on the electronic device are captured in a state of a camera being handheld in a static mode and a dynamic mode. Therefore, videos are prone to jitters causing an unpleasant viewing experience. In one or more examples, the media stabilization methods include the following steps such as motion estimation, motion smoothing and motion compensation. The existing methods use input frames and readings from IMU sensors (102) to estimate camera motion followed by methods to smoothen the camera motion path. Motion compensation is applied to accommodate a difference between an original path and a smooth path. In one or more examples, a motion compensated video frame is cropped to remove blank regions created due to motion compensation. Since, the media stabilization is an integral part of camera pipeline in the electronic device, poorer stabilization and excessive crop may reduce the user experience. In an embodiment of the disclosure, a full frame media stabilization uses prior motion information for adaptive path smoothing and dynamic frame fusion for improved field of view.

FIG. 1 is a schematic illustrating full frame media stabilization using motion sensor (1803), according to an embodiment of the disclosure. Referring to FIG. 1, selecting the stabilization procedure based on a type of motion and a variation in the type of motion is disclosed. In one or more examples, media frames (103) are provided as an input to a vision-based motion analysis module (101) for analyzing the media frames (103). The media frames may be, but not limited to, a single still image or moving images.

The vision-based motion analysis module (101) in electronic devices analyze and interpret visual information captured by the device's camera or sensor. The analysis may involve extracting meaningful data, detecting objects or features, recognizing patterns, and making decisions based on the visual input. The vision-based motion analysis module (101) in electronic devices may include, but not limited to, an object detection, a facial recognition, an image classification, an optical character recognition, an image segmentation, a gesture recognition, or any other recognition type known to one of ordinary skill in the art. The output of the vision-based motion analysis module (101) is fed to an ego motion classifier (104) and complexity determination module (105).

The ego motion classifier (104) receives the input from an IMU sensor (102). The ego motion classifier (104) estimates the motion or movement of an electronic device or sensors. The ego motion classifier (104) analyzes the visual input captured by the electronic device or sensor, and determines the movement of the electronic device. The ego motion classifier (104) may determine translation or rotation of the electronic device. The ego motion classifiers (104) may employ techniques, such as feature detection and matching, optical flow analysis, and geometric transformations, to estimate the camera's motion. The techniques may analyze the changes in visual patterns and geometry across consecutive frames to infer the electronic device movement. The ego motion classifier (104) outputs the type of motion of the electronic device and media frames are dynamically selected for frame fusion. The dynamic stabilization parameters may be tuned to receive the motion adaptive path smoothing.

The complexity determination module (105) is designed to assess complexity level of an input or task. The complexity determination module (105) analyses and quantify the complexity of the input based on factors, enabling the electronic device (100) to make informed decisions or perform appropriate actions based on the complexity assessment. The complexity determination module (105) may be implemented using different techniques and approaches, depending on the specific domain and requirements. The different techniques or approaches may be, but not limited to, text complexity, task complexity, data complexity or any other complexity feature known to one of ordinary skill in the art. The output of the complexity determination module (105) is transmitted to motion adaptive path smoothing module (107). The output of the complexity determination module (105) is fed to the motion adaptive path smoothing module (107). The output received may be but not limited to scores for stabilization procedures.

The motion adaptive path smoothing module (107) considers the aspects such as, but not limited to, motion analysis, control points or key frames, smoothing method, adaptive smoothing, or any other suitable features known to one of ordinary skill in the art. In one or more examples, the motion adaptive path smoothing module (107) creates natural and visually appealing motion for characters, objects or cameras. The method of obtaining motion adaptive path smoothing is further described in FIG. 10.

A motion estimation module (106) receives, as input, media frames (103) and the outputs of the IMU sensor (102) for estimating type of motion of the electronic device. The motion adaptive path smoothing module (107) may dynamically select smoothing of the media frames (103) based on the type of motion and complexity of the motion.

In one or more examples, a motion adaptive dynamic multi-frame fusion module (108) merges the frames received from past and future frames. The multiple frames are merged using a frame fusion procedure. In one or more examples, the frame fusion procedures are merged based on the type of the motion and the variation in the type of the motion. The motion adaptive dynamic multi-frame fusion module (108) outputs the full frame stabilized media by using the stabilized media frames (103) with a missing area (e.g., blank region). The output of the ego motion classifier (104) is fed to the motion adaptive dynamic multi-frame fusion module (108) to generate the stabilized frame with preserved field of view.

Using the present disclosure, scenario-based parameters may be selected. Dynamic selection of crop constraints based on the motion type and motion based multi-frame selection and fusion to preserve field of view.

Figure 2:
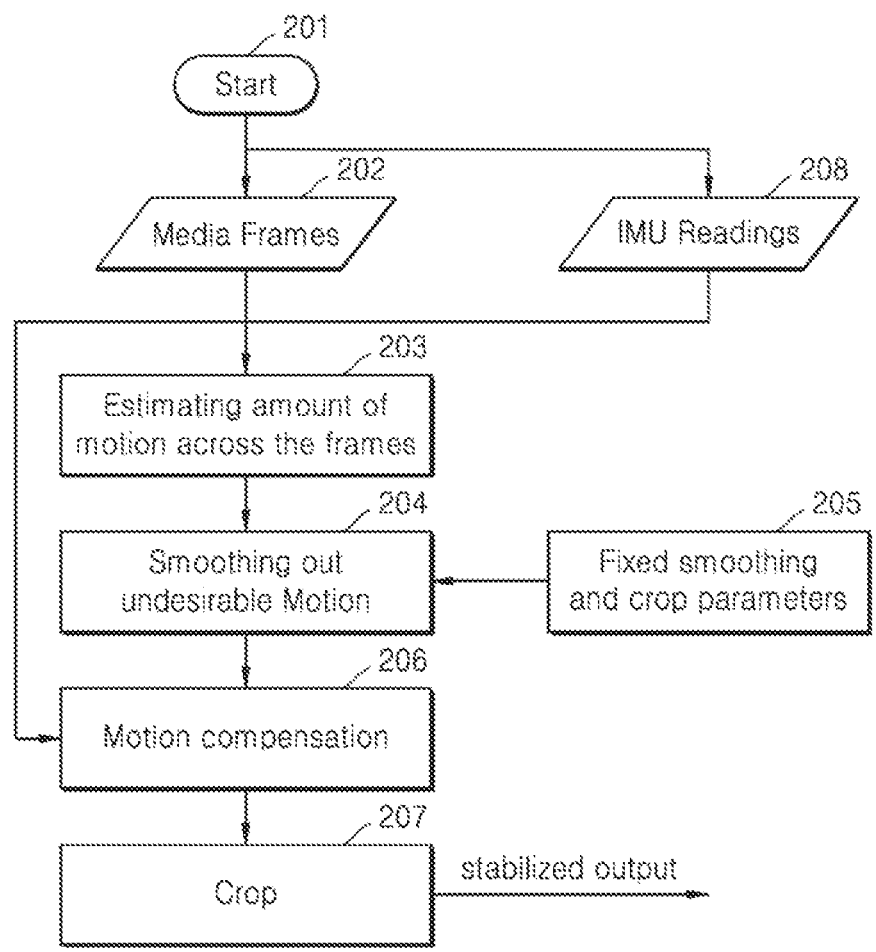
FIG. 2 is flow diagram illustrating media frame stabilization.

FIG. 2 is a flow diagram illustrating full frame media stabilization. Referring to FIG. 2 the media frames (103) are taken as input (202). In operation 203, an amount of motion across the frames are estimated. The amount of motion may be determined based on the motion of the camera. The amount of motion may be velocity, acceleration, or any other suitable motion information known to one of ordinary skill in the art.

In operation 204, the media frames (103) are smoothed based on the amount of motion in the media frames (103).

The method of smoothing the received media frames (103) helps reduce noise or unwanted details in the media frames (103). There are various methods to achieve smoothing in image processing such as, but not limited to, a box blur, a Gaussian blur, a median filter, a bilateral filter, a non-local means filter, or any other suitable method known to one of ordinary skill in the art.

In operation 205, the smoothing method utilizes the amount of motion to prepare a fixed smoothing and crop parameters. The fixed smoothing may infer smoothing of the media frames (103) considering only the amount of motion of the input media frames (103). The crop parameters may be the parameters considered while cropping out the unwanted part of the media frames (103) for achieving smooth media frame. The crop parameter may be the part of the media frame to be cropped for a better media smoothing.

A motion compensation is performed at operation 206. The output of the IMU sensor (102) may be considered to determine motion compensation of the media frames (103). The motion compensation may be a method to reduce temporal redundancy between consecutive frames in a video sequence. The method involves estimating the motion between frames and compensating for the motion to generate efficient media compression. The estimation of the motion between the frames may be determined using IMU readings (208).

The cropped media frames (103) are obtained at 207 to get the stabilized output.

As understood by one of ordinary skill in the art, the existing methods rely on a fixed selection of parameters and restricted field of view during smoothing undesirable motion, therefore leading to fewer stable videos. Constant restriction in the field of view during stable frame generation, results in loss of important details across periphery of the frames.

Figure 3:
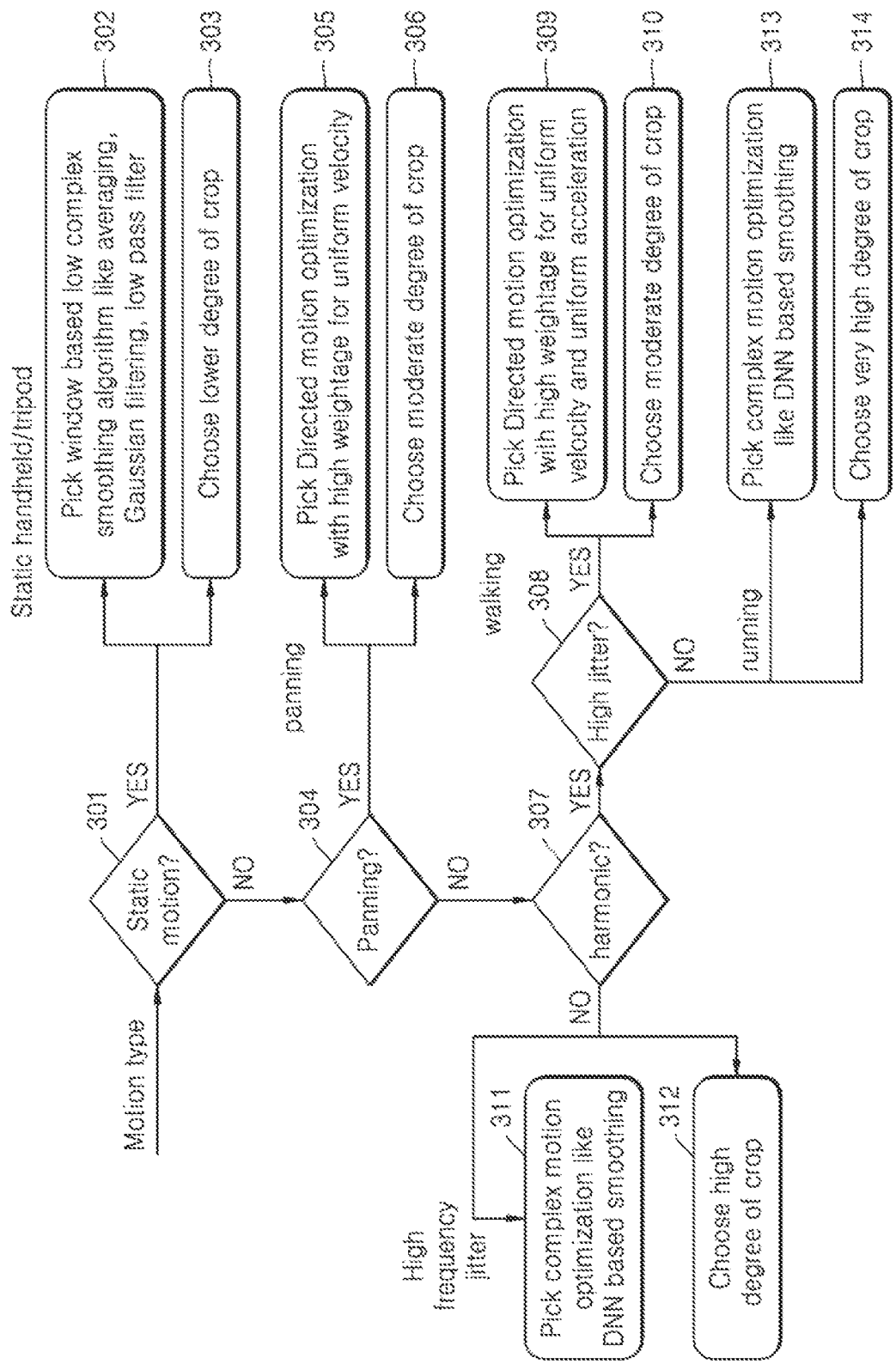
FIG. 3 is a flow diagram illustrating full frame media stabilization based on type of motion, according to an embodiment of the disclosure.

FIG. 3 is a flow diagram illustrating full frame media stabilization based on type of motion, according to an embodiment of the disclosure.

In an embodiment of the present disclosure, the variations in camera motion change according to the video-capturing scenarios. The camera motion types include, but are not limited to, static motion, panning motion, harmonic motion, and high frequency motion. The static motion (e.g., rotation, translation, etc.) may have an amplitude that is less than the other types of motion. In one or more examples, a static motion may a motion that has an amplitude that is less than a threshold. An average of moments in a relatively adequate time window will be close to zero. In a panning motion, a rate of change of motion is close to a constant value. In one or more examples, a uniformity of direction of motion is not fixed. For example, a user may move from left to right, right to left, top to bottom, bottom to top.

The harmonic motion may be further sub divided into a small amplitude or large time period (e.g., walking) and a large amplitude or small time period (e.g., running). The motion of a mix of uniform velocity and uniform acceleration may be taken into account.

The high frequency motion may be characterized by high frequency jitters. For example, a camera mounted on bike will experience very high jitters if a bike moves on bad or uneven surface. For example, if an amount of jitter in a motion has a frequency greater than a frequency threshold, the motion may be classified as a high frequency motion.

In an embodiment, to determine the stabilization procedure and the frame fusion procedure, the type of the motion is identified. Based on the type of motion, the stabilization procedures and the frame fusion procedures are selected. In operation 301, if the motion is a static motion, then operation 302 is performed. When the type of motion is not a static motion, then it is determined whether the motion is a panning motion at operation 304. When the type of motion is static, then a low complex smoothing method is selected at operation 302. The low complex smoothing method may be but not limited to averaging, Gaussian filtering, low pass filter and the like. In one or more examples, a lower degree of crop is selected when the motion is static (at operation 303).

In an embodiment, when the type of motion is a panning motion (at operation 304), the directed motion optimization is selected with high weightage for uniform velocity at operation 305. A moderate degree of crop is selected as the type of motion is the panning motion at operation 306. The motion optimization is performed using, but not limited to, mathematical minimization methods.

In an embodiment, when the type of motion is determined as harmonic motion with high jitter at operations 307 and 308, the directed motion optimization with high weightage for uniform velocity and uniform acceleration is selected at operation 309. In one or more examples, the electronic device (100) may determine that a user is walking when the type of motion is harmonic and with high jitter. For the condition, the moderate degree of crop is selected.

In an embodiment, when the type of motion in not harmonic, then the motion may be considered having a high frequency jitter. A complex motion optimization is selected such as but not limited to DNN based smoothing at operation 311. In one or more examples, a high degree of crop is selected for the condition at operation 312.

In one or more examples, when the user is running, the condition may be considered as harmonic with high jitter. A complex motion optimization is selected such as, but not limited to, DNN based smoothing at operation 313. In one or more examples, a high degree of crop is selected, in response to detecting the harmonic motion with high jitter at operation 314.

In existing methods for stabilization, the method for smoothing the camera motion and the amount of crop in the stabilized video is disadvantageously fixed. Since the camera motion differs according to video capturing scenarios, the type of the motion may be advantageously used to select both the motion smoothing process and the amount of crop during stabilization. Instances of using the camera motion type as prior information for stabilization are described herein.

In one or more examples, when the camera is fixed on a tripod, there may be no need for a stabilization process.

In one or more examples, when the camera is held in hand when the user is capturing the images or videos, then simple smoothing methods or less complex methods such as Gaussian filtering may be used. Since the scene almost remains the same throughout the video, the crop in output may be minimal.

In one or more examples, when the user is panning the electronic device, the optimization-based methods may force the motion of the electronic device to have uniform velocity. The optimization-based methods may further be used to smooth the motion of the electronic device. The crop in the output video may be chosen depending on how fast the user is panning the electronic device.

In case of walking or running, in one or more examples, the solution for smoothing the camera motion and the crop in stabilized video depends on the speed at which the activity is performed.

In one or more examples, when the user is walking or running slowly, then optimization-based solutions may smooth the motion of the electronic device. However, when the user is walking or running fast, then a complex deep-learning solutions for smoothing the motion of the electronic device may be required.

In the case where the camera motion undergoes rapid variations, such as when placed in a bike, in one or more examples, a complex learning-based solutions need to be used to smooth the motion of the electronic device and a higher crop amount is required.

Figure 4:
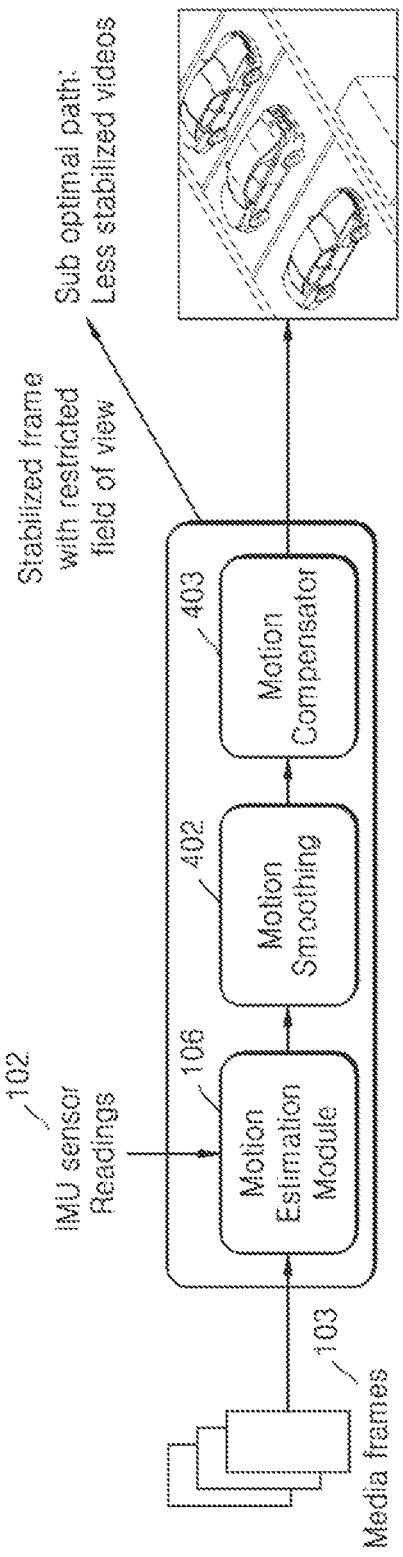
FIG. 4 is schematic illustrating media frame stabilization method using IMU sensor.

FIG. 4 is a schematic illustrating media frame stabilization method using IMU sensor (102). The schematic includes the motion estimation module (106), motion smoothing (402), and motion compensator (403).

The motion estimation module (106) receives the media frames (103) captured by the image sensor and the readings from IMU sensors (102). The IMU sensors (102) are combination of multiple sensors such as but not limited to accelerometer, gyroscope, and magnetometer. The sensors measure and report the information about object's orientation, acceleration, and magnetic field strength and the like. The electronic devices use optics and sensors to convert light into electrical signals. The electrical signals may be processed and stored as images or videos. The motion estimation module (106) estimates the motion of the media frames (103) from by considering the IMU sensor readings. Further, once the motion of the media frames (103) are estimated, then the media frames (103) are smoothed.

The motion smoothing is performed by inserting additional frames between the original frames of the media frames (103) to increase the perceived frame rate. The process is achieved through motion estimation and motion compensation methods. In one or more examples, the methods may analyze the motion in the video and generate interpolated frames to fill in the gaps between the original frames.

In motion estimation, the current media frame and a reference frame is analyzed to identify regions that have undergone motion. The motion estimation module (106) determines the motion vectors representing the displacement of the regions between the two media frames (103). Various algorithms, such as, but not limited to, block matching or optical flow, are used to estimate the motion vectors accurately. In motion compensation, motion vectors are obtained. The motion compensator (403) applies the motion vectors to the reference frame to generate a prediction of the current frame. The prediction is then subtracted from the actual frame, resulting in a residual or error frame that contains the differences between the prediction and the original frame. The residual frame may be compressed using techniques such as transform coding and entropy coding. Using the components, the stabilized frame with restricted field of view is obtained.

In existing methods of media stabilization, fixed parameters for all capture scenarios are used, thereby leading to constant field of view restriction, and less stabilized video with a restricted field of view.

Further, in the existing methods, video stabilization engines use camera motion agnostic parameters to smoothen the camera motion. There may be multiple smooth camera paths for a given input camera path, where choosing the optimal path resulting in pleasing stable video is challenging with the existing methods. Most of the existing methods disadvantageously restrict the field of view to obtain the stabilized frames. The restriction in the field of view is constant for a video, leading to loss of important details. For example, a video captured in static scenario may be stabilized with 5-10% restriction in the field of view, while dynamic videos need 20-30%.

Figure 5:
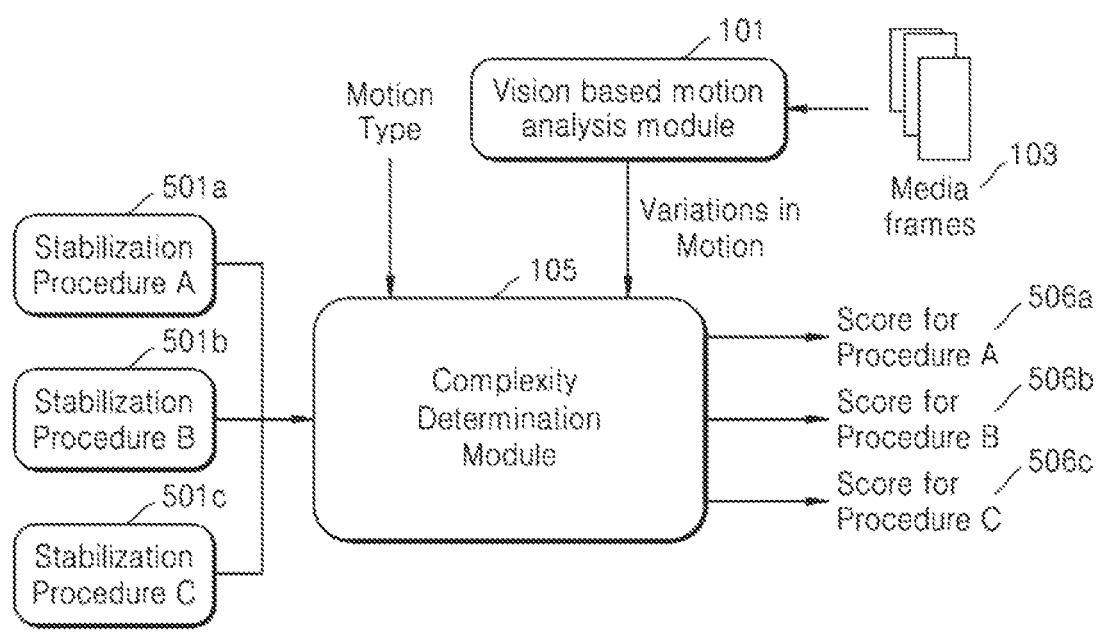
FIG. 5 is schematic illustrating complexity determination module for full frame media stabilization, according to an embodiment of the disclosure.

FIG. 5 is a schematic illustrating complexity determination module (105) for full frame media stabilization, according to an embodiment of the disclosure. FIG. 5 referred along with FIG. 6 determines the scores for each procedure.

The complexity determination module (105) includes a number of stabilization procedures. Referring to FIG. 5, stabilization procedures may be more than one such as but not limited to stabilization procedure A (501a), stabilization procedure B (501b), and stabilization procedure C (501c). The complexity determination module (105) receives parameters such as the type of motion, vision-based motion analysis module (101) using the media frames (103) and the stabilization procedures. The parameters may be used to generate the scores for the respective procedures. The scores may be, but not limited to, a score procedure A (506a), a score procedure B (506b), and a score procedure C (506c).

The proposed disclosure illustrates an adaptive method for motion smoothing, and adjusts parameters and field of view based on the input video capture scenarios. Moreover, an embodiment of the disclosure proposes a light-weight, yet adaptive method, to preserve the field of view and generate stable videos using the determined smoothed motion path.

Figure 6:
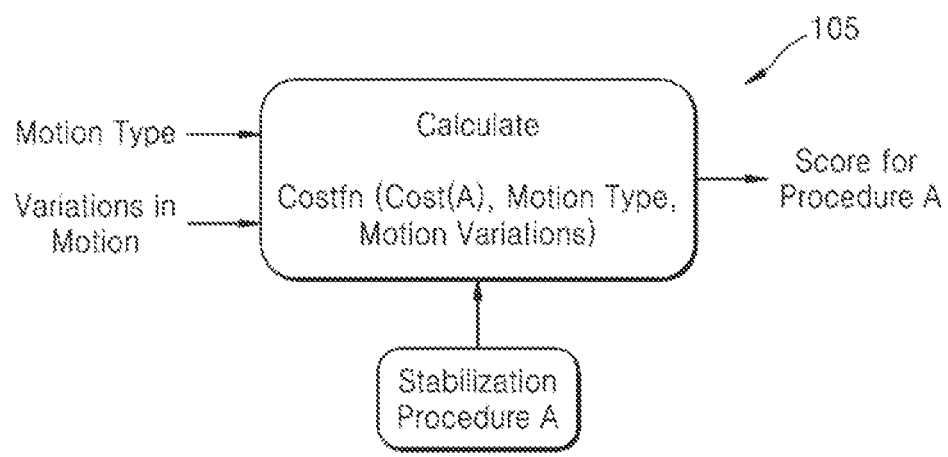
FIG. 6 is a block diagram illustrating score calculation in the complexity determination module for full frame media stabilization, according to an embodiment of the disclosure.

FIG. 6 is block diagram illustrating score calculation in the complexity determination module (105) for full frame media stabilization, according to an embodiment of the disclosure.

Referring to FIG. 6, a complexity determination module (105) is disclosed. The complexity determination module (105) determines the score for plurality of stabilization procedures (501). Determining the score requires type of motion and variations in type of motion obtained from vision-based motion analysis module (101). The parameters may be considered for calculating scores such as cost for every stabilization procedure (501) including power consumption and time taken.

In an embodiment, the function 'Costfn' determines score of a procedure depending on cost of the procedure and quality of stabilization of a motion depending on type and variations. An example is considered for a stabilization procedure A. However, as understood by one of ordinary skill in the any one of stabilization procedure B and stabilization procedure C may be used. The type of motion and variation in the type of motion are fed as input to determine the complexity of the media frames (103) captured using the electronic device. The 'Costfn' determines the score of the procedure A using the cost for procedure A, motion type, variation in the type of motion. The complexity determination module (105) outputs the score for the procedure A. The cost may be time and energy complexity of procedure A.

Figure 7:
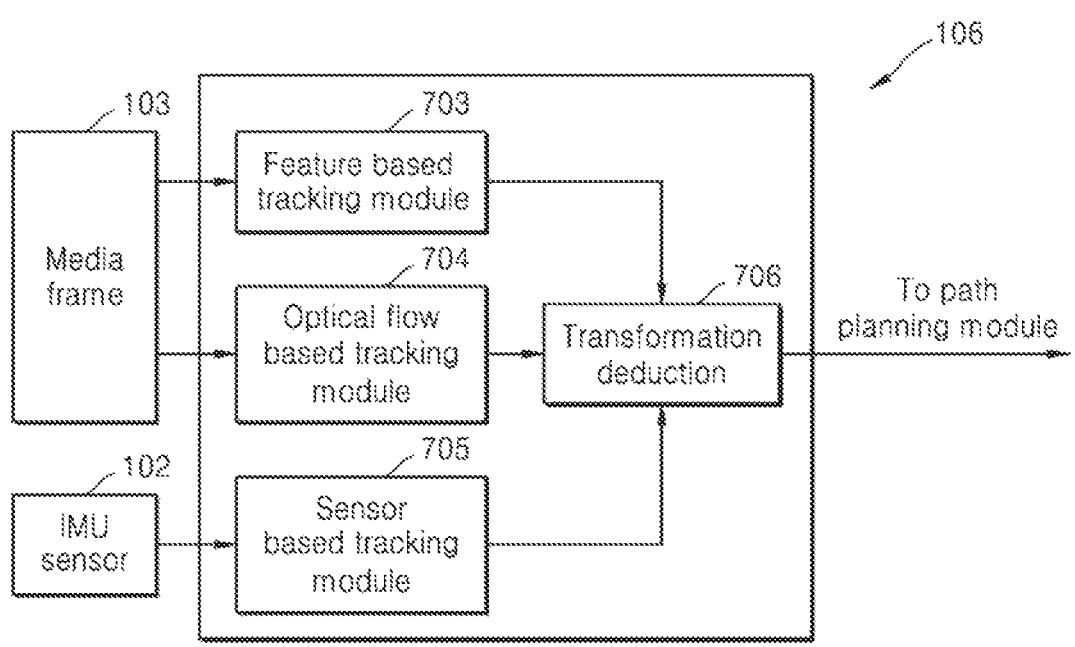
FIG. 7 is a block diagram illustrating motion estimation block.

FIG. 7 is the block diagram illustrating motion estimation module (106). Referring to FIG. 7, feature based tracking module (703) is performed using the media frames (103).

In an embodiment, the motion estimation module (106) includes feature tracking module (703), optical flow-based tracking module (704), sensor-based tracking module (705), and transformation deduction (706). The media frames (103) and readings from the IMU sensor (102) is received to determine the transformation deduction (706). The motion estimation module (106) determines transformation between successive media frames (103). The input given to the motion estimation module (106) may be media frames (103), and readings from IMU sensor (102). The output of the motion estimation module (106) is a 2D or 3D transformation between successive frames of the media frames (103). The output of motion estimation module (106) is used for determining 2D or 3D electronic device (100) trajectory that is smoothened to obtain stable video.

The feature-based tracking module (703) in image capturing may refer to a technique that uses distinctive features or key points in an image to track and analyze the movement or changes in those features across consecutive frames. It is commonly used in computer vision, image processing, and robotics applications. The feature-based tracking (703) includes feature extraction, feature matching, tracking and motion estimation, and object recognition or visual odometry. The feature extraction includes extracting distinctive features or key points from an initial image or frame. The key points may be, but not limited to points, corners, edges, or other distinctive regions in the media that may be reliably detected. Examples of popular feature extraction methods include the Scale-Invariant Feature Transform (SIFT) and Speeded-Up Robust Features (SURF). In feature matching, once the features are extracted from initial media frames (103), the media frames (103) are compared with the features in subsequent frames to establish correspondences. Feature matching methods, such as the nearest neighbour or RANSAC (Random Sample Consensus), are employed to find the best matches between key points in different frames. By establishing correspondences between features in consecutive frames, the method may track the movement or changes of the features over time. The motion of the key points may be estimated by analysing the displacements between matched key points, allowing for the tracking of objects or camera motion.

The tracked features may be further utilized for tasks such as object recognition. In the object recognition or visual odometry, the tracked key points are matched with a known database of object features to identify and track specific objects. In visual odometry, the tracked key points are used to estimate the camera's movement or pose relative to the environment. Feature-based tracking is commonly used in applications such as augmented reality, object tracking, visual navigation, and image stabilization. The feature-based tracking module (703) enables the detection and tracking of specific features or objects in the media frames (103), facilitating various tasks such as real-time interaction, object detection, and pose estimation.

The optical flow-based tracking module (704) is a method used to estimate and track apparent motion of pixels or image features between consecutive frames in a video sequence. The optical flow-based tracking utilizes the concept of optical flow that describes the motion of objects or points in the media frames (103) by estimating the velocity of the apparent displacement. The optical flow-based tracking module (704) includes optical flow estimation, feature tracking, robustness and error handling.

The optical flow-based tracking module (703) estimates the optical flow field representing the apparent motion of pixels or features between two consecutive frames. There are various methods for optical flow estimation, such as Lucas-Kanade, Horn-Schunck, and Farneback's method. The methods analyze the pixel intensity values or gradients between frames to calculate the motion vectors or flow vectors for each pixel or feature.

Once the optical flow field is estimated, the motion vectors may be used to track specific features or regions of interest across frames. The motion vectors provide information about the displacement and direction of the features, allowing the motion vectors to be tracked over time. Feature tracking methods may be applied to follow the trajectory of the features based on the estimated optical flow.

The optical flow estimation may be sensitive to noise, occlusions, and large displacements. To handle these challenges, robust techniques such as outlier rejection, smoothing, and regularization may be employed. Additionally, methods such as pyramidal or multi-resolution analysis may be used to improve the accuracy and efficiency of optical flow estimation.

The optical flow-based tracking module (704) has various applications, including, but not limited to, object tracking, motion analysis, video surveillance, and autonomous navigation. The optical flow-based tracking module (704) provides valuable information about the movement and dynamics of objects in a scene, enabling tasks like object tracking, action recognition, and behaviour analysis. However, the optical flow-based tracking may have may include limitations in cases of large displacements, occlusions, or complex motion patterns.

The sensor-based tracking module (705) receives the input from the IMU sensor (102) for sensor-based tracking. The sensor-based tracking module (705) monitors and records data using sensors. The motion estimation module (106) determines the transformation between successive media frames (103). The input to motion estimation module (106) may be media frames (103), aligned IMU sensor readings. The output of the motion estimation module (106) is 2-Dimensional or 3-Dimensional between the successive frames. The output of the motion estimation module (106) is used for determining 2D or 3D camera trajectory. The camera trajectory is smoothed to obtain stable media. The transformation deduction (706) reduces temporal redundancy between consecutive frames in a video sequence to improve compression efficiency. In motion estimation, the current frame (e.g., referred to as the target frame) is compared with one or more reference frames to identify regions of the frame that have moved. The motion vectors representing direction and magnitude of the motion are estimated for the regions. Once the motion vectors are obtained, transformation deduction (706) is performed. In transformation deduction (706), the target frame regions that have moved are transformed to match the corresponding positions in the reference frames. The transformation is based on the motion vectors and involves spatial displacements and interpolations.

Figure 8:
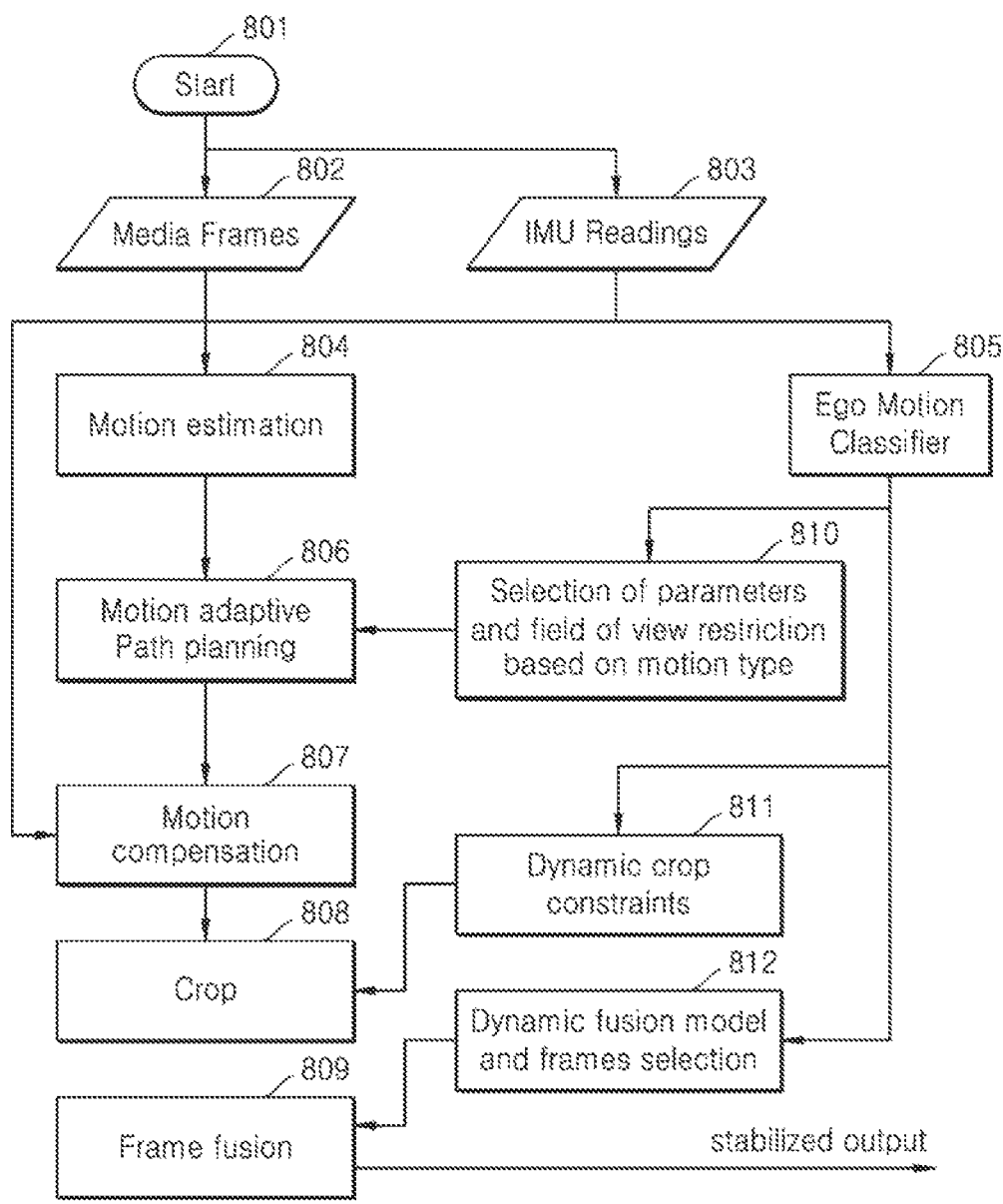
FIG. 8 is a flow diagram illustrating full frame media stabilization using time-windowed ego motion variation, according to an embodiment of the disclosure.

FIG. 8 is the flow diagram illustrating full frame media stabilization using time-windowed ego motion variation, according to an embodiment of the disclosure.

At operation 801, the method for media stabilization using time windowed ego motion variation is initiated.

At operation 802, media frames (103) are received by the electronic device (100) for converting the received media frames (103) into stabilized frames.

At operation 803, the IMU readings are collected for determining the type of motion of the electronic device (100). The IMU sensors (102) may be, but not limited to, an accelerometer, a gyroscope, a magnetometer, or any other suitable sensor known to one of ordinary skill in the art. In one or more examples, the IMU sensors (102) measure and report various types of motion related information about an object or device. The IMU may include multiple sensors that work together to provide accurate data on object orientation, velocity, and acceleration.

At operation 804, the motion estimation module (106) determines the motion of the electronic device (100). The motion of the electronic device (100) may be detected while capturing the media frames (103). For example, the motion of the electronic device (100) may be detected while the electronic device (100) is in operation and capturing the media frames (103). The media frames (103) are captured using the image sensor (1804) of the electronic device (100). The type of the motion of the electronic device (100) is determined while capturing the media frames (103) and variation in the type of motion is determined for the electronic device (100) over a pre-determined period of time.

At operation 805, the output of the ego motion classifier (104) is used to select stabilization parameters and choose field of view restriction, thereby enabling the motion smoothing to determine the optimal smoothed path corresponding to the stable video. The stabilization parameters may be, but not limited to, power consumed for stabilization of the media frames (103) by each of the plurality of stabilization procedures (501), time taken for stabilization of the media frames (103) by each of the plurality of stabilization procedures (501), and a correlation between each media frames (103) and each stabilization procedures (501). The type of motion may be determined based on the media frames (103) and motion sensor (1803).

At operation 806, motion adaptive path learning is performed. The motion adaptive path planning obtains one or more possible smooth trajectories using an original trajectory. The trajectory is obtained from motion estimation.

At operation 810, the parameters and the field of view restriction is selected based on the motion type. The parameters are selected based on the outputs from the input media frames (103) and the IMU sensor readings.

At operation 807, the motion compensator (403) module applies the original camera trajectory and camera trajectory on the input video frame. The motion transformation may be 2D or 3D based on the motion estimation and path planning module.

At operation 808, the media frames (103) are cropped for obtaining the stabilized media frames (103). At operation 811, the media frames (103) are dynamically cropped based on the stabilization procedures (501). The type of motion and the variation in the type of motion of the media frames (103) are dynamically determined, and the media frames (103) are cropped based on the stabilization procedures (501) selected.

At operation 809, a frame fusion procedure is performed. The stabilization procedures (501) are selected for stabilizing the media frames (103). Once the stabilized frames are obtained, the frame fusion procedure is used to merge the media frames (103) to obtain full frame stabilization. At operation 812, the frame fusion procedure is obtained based on the type of motion and variation in the type of the motion of the electronic device (100). The media frames (103) are stabilized based on the selected stabilization procedures (501) and the selected frame fusion procedure to obtain the full frame media stabilization. The stabilization procedures (501) selection includes determining a complexity level of the motion based on at least the stabilization parameter, the type of the motion, and the variation in the type of the motion. The stabilization procedure is selected based on the complexity level of the motion.

In an embodiment, the stabilization of the media frames (103) based on the stabilization procedures (501) and the selected frame fusion procedure includes receiving the stabilized media frame. The media frame is stabilized based on the selected stabilization procedures (501). The frame fusion based on the type of motion for the stabilized media frames (103). The full frame media stabilization is determined using the frame fusion procedure for the stabilized media frames (103).

Figure 9:
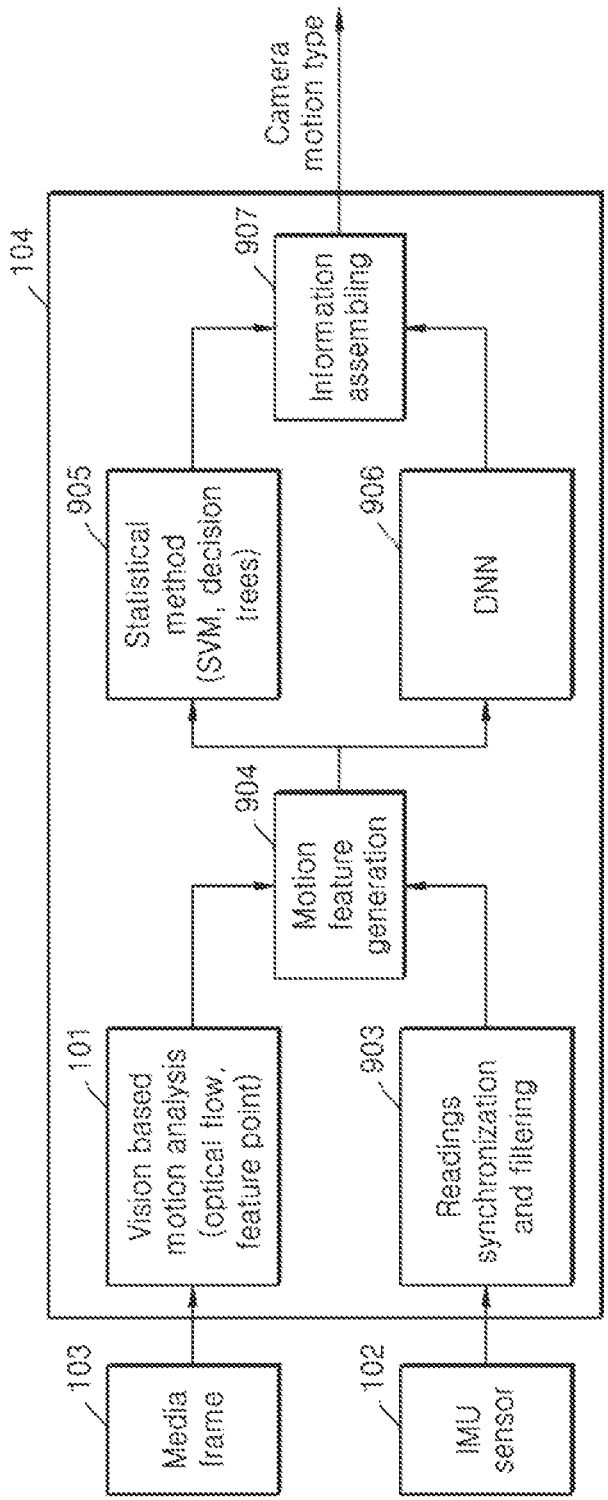
FIG. 9 is a block diagram illustrating ego motion classification for full frame media stabilization, according to an embodiment of the disclosure.

FIG. 9 is a block diagram illustrating ego motion classifier (104) for full frame media stabilization, according to an embodiment of the disclosure.

Referring to FIG. 9, the ego motion classifier (104) classifies the activity of the user while recording the video. The ego motion may be classified into common motion types such as but not limited to static, walking, running and panning. The ego motion may be estimated using vision-based motion analysis module (101) and IMU based analysis. The ego motion may also be determined using Deep Neural Network (DNN). Output of the ego motion classification is provided to an adaptive path planning process to choose a path smoothing method based on the current motion type. The output of the ego motion may be used by a dynamic frame fusion module to choose appropriate frame fusion procedure to generate full frame media stabilized output.

The ego motion classification includes vision-based motion analysis module (101) and readings synchronization and filtering (903), statistical method (905), DNN (906) and information assembling (907). The ego motion classification includes vision-based motion analysis, IMU readings synchronization and filtering, statistical methods, DNN, and information assembling to specify the media motion type. In one or more examples, the DNN method is a neural network-based model to determine ego motion type.

The media frames (103) are given as input to the ego motion classifier (104). The ego motion classification uses the motion related information to analyze and classify the motion of the ego object or the electronic device (100). The ego motion classification may include the image acquisition, motion estimation, feature extraction, classification, training and validation, motion classification.

In one or more examples, the images may be captured using the cameras mounted in the electronic device (100). The images are obtained at regular intervals or triggered by specific events such as motion detection. The captured media frames (103) are processed to estimate the motion between consecutive frames. The various techniques are used for motion estimation such as optical flow, feature tracking, or dense matching method. The method may analyze the displacement of pixels or image features between frames to determine the apparent motion. Relevant features or descriptors are extracted from the motion information. The relevant features may include identifying key points, tracking object contours, or computing optical flow vectors. The extracted features represent the motion characteristics in the captured image sequence. The relevant features or descriptors are extracted from the motion information. The extraction may involve identifying key points, tracking object contours, or computing optical flow vectors. By extracting motion features from the images and feeding the images into the classifier, the ego motion may be accurately classified into predefined motion classes, such as forward, backward, turning left or right, or any other relevant motion categories.

The vision-based motion analysis module (101) receives the input as media frames captured using the electronic device (100). The media frames are analyzed by the vision-based motion analysis module (101) to determine the type of motion in the electronic device (100). The type of motion may be, but not limited to static, walking, running, panning, or any other motion known to one of ordinary skill in the art. The vision-based motion analysis extracts relevant motion-related information from images or video sequences, allowing for various applications such as surveillance, object tracking, activity recognition, human-computer interaction, and robotics. Several method and techniques are used in the vision-based motion analysis such as, but not limited to, optical flow, background subtraction, feature tracking, activity recognition and 3D reconstruction and structure from motion (SfM).

The electronic devices often employ various statistical analysis methods to enhance image quality, perform image processing tasks, and extract useful information from the captured images. A common statistical analysis methods used in electronic devices may be noise reduction methods, image compression methods, histogram equalization method, edge detection methods, image segmentation, object recognition and optical character recognition (OCR).

In one or more examples, a feature tracking method may identify and track specific features or points of interest in consecutive frames. The features may include corners, edges, or other distinctive points. In one or more examples, techniques such as Kanade-Lucas-Tomasi (KLT) tracking and feature point matching with descriptors (e.g., SIFT, SURF, or ORB) may be used for feature tracking and motion estimation. The motion feature generation is a process of extracting relevant motion-related information from video or image sequences. The features capture characteristics of motion patterns and dynamics that may be used for various applications such as motion analysis, action recognition, gesture recognition, and activity monitoring.

The information assembling (907) receives the outputs of the statistical method such as SVM decision tree and DNN. The information assembling with the inputs from the statistical method and DNN generates the type of motion of the camera. In the present disclosure, the camera and the electronic device are interchangeably used.

Figure 10:
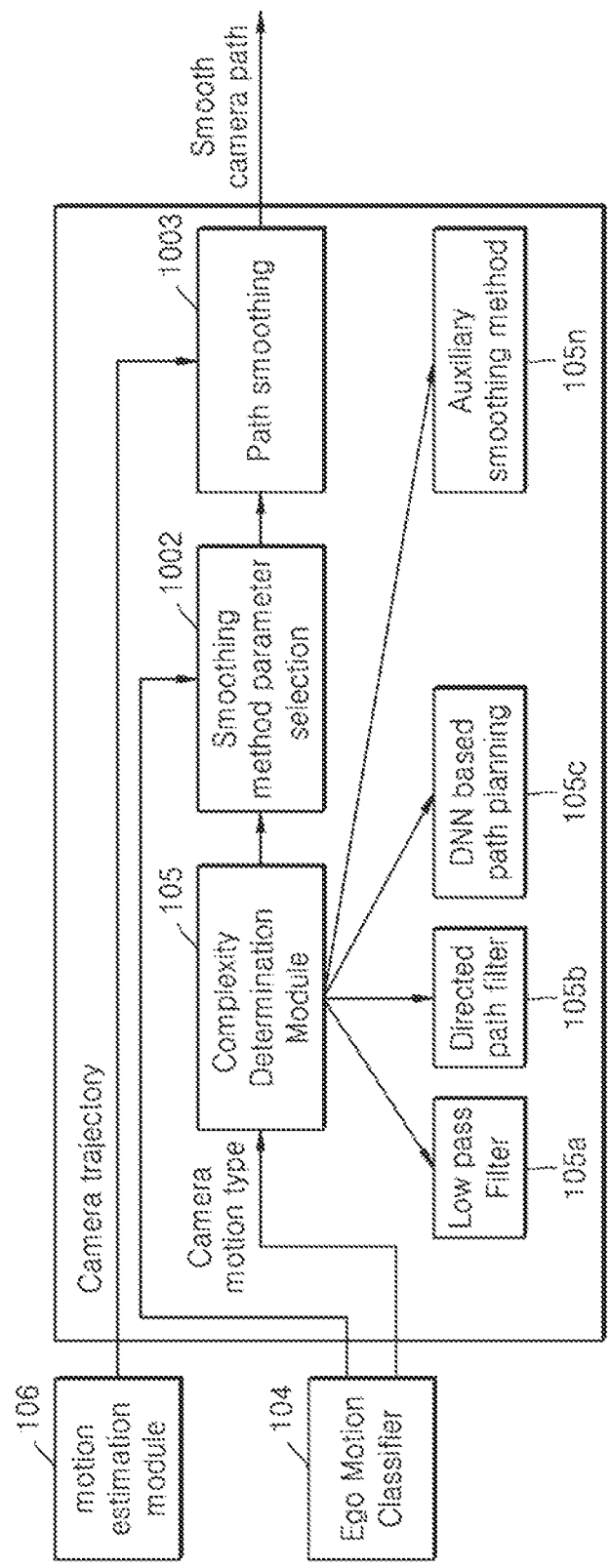
FIG. 10 is a block diagram illustrating motion adaptive path planning for full frame media stabilization, according to an embodiment of the disclosure.

FIG. 10 is a block diagram illustrating motion adaptive path planning for full frame media stabilization, according to an embodiment of the disclosure. The motion adaptive path planning may be performed to obtain the possible smooth trajectory using camera trajectory obtained from motion estimation module (106). The motion adaptive path planning includes smoothing methods with different behavior based on a type of detected motion. The smoothing methods may be the stabilization procedures (501) used for stabilizing the media frames (103). The smoothing methods may be Gaussian smoothing, Neural network based smoothing, Mathematical minimization based smoothing etc.

In an embodiment, the motion adaptive path smoothing module (107) classifies the smoothing methods based on the motion type and variation in the type of motion. Based on the motion type and variation in the type of motion, the complexity determination module (105) assigns the scores to the media frames (103). The scores are used to select possible stabilization procedures (501) for stabilizing the media frames (103). Based on the motion type received from the ego motion classification module (104), an appropriate smoothing method and the hyper parameters are selected. The selected path smoothing method or the stabilization procedure is used to smoothen the input camera trajectory.

In an embodiment, the motion estimation and ego motion classifier (104) is considered to determine the adaptive path planning module. The motion estimation module (106) outputs the camera trajectory of the media frame and the ego motion classification outputs camera motion type. The complexity determination module (105) determines usability score for the stabilization procedures (501). The score determination requires motion type and variation in type of motion obtained from the vision-based motion analysis module (101). The scores require parameters such as cost of every stabilization procedure (501) including the power consumption and time consumption. A smoothing method parameter selection module (1002) selects the parameters for path smoothing (1003) the media frames (103). The path is smoothened based on the stabilization procedures (501) selected based on the parameters selected using the smoothing method parameter selection module (1002). In one or more examples, the smoothing method parameter selection is based on the ego motion classification. The path smoothing (1003) is determined by considering the camera trajectory and the smoothing method parameters selection.

In one or more examples, the complexity determination module (105) includes a low pass filter (105a), directed path filter (105b), DNN based path planning (105c) and auxiliary smoothing method (105n). The low pass filter signal reduces high-frequency noise or rapid changes in the image. By attenuating high-frequency components, the low pass filter may smooth out the image and provide a more coherent representation of the captured image. This attenuation may help in simplifying the visual information and reducing the complexity of the image, making the visual information easier to process and analyse. A directed path filter analyzes the spatial or temporal dependencies within a sequence of media frames (103). The directed path filter identifies patterns or paths of information flow, capturing the directional behavior in the visual data. By quantifying and measuring the directed paths, the filter may provide insights into the complexity of the visual scene or the motion patterns within the captured frames.

The Deep Neural Networks (DNNs) may be utilized for path planning in cameras. By training a DNN with appropriate data, the DNN may learn to predict optimal paths or trajectories for objects or the camera. The DNN takes input from the camera's visual data, such as images or media frames (103), and outputs a path or trajectory that minimizes a specific cost or objective function. These features enable the camera system to autonomously plan the movements or guide objects along desired paths based on the visual input. Auxiliary smoothing method may be used in conjunction with DNN-based path planning to refine the predicted paths or trajectories. The method helps in reducing abrupt changes or jitters in the path, resulting in smoother and more visually pleasing movements.

In an embodiment, the complexity of obtaining optimal smooth camera path may depend on a type of camera motion while capturing the media frames (103). For example, when the user is static, a simple windowed average over long duration may result in optimal smooth camera path. In one or more examples, when the user is performing a complex motion like walking, running, jumping, a complex path smoothing algorithms like directed path or DNN based approach may be used to obtain smooth camera trajectory. The performance of stabilization is dependent on the stabilization procedures (501) and the hyper parameters used for smoothing. In one or more examples, a windowed average technique may be suitable for simple hand-held recording for the media frames (103). The windowed average technique may not be suitable for activities such as running, walking, or any other complex motion. The methods such as L1 directed needs specific hyper parameters to operate as intended. In the activity such as walking, the walking parameters may be different compared to parameters for running. Adaptive motion path planning uses information from ego motion classification to determine type of stabilization procedures (501) to use and the parameters for the stabilization procedures (501).

In one or more examples, when the output from motion classifier is static, then the windowed average technique is selected as path smoothing method. Since, the windowed average is less complex, power and performance is optimal with similar results to complex smoothing methods. When the output from motion classification is walking, the stabilization procedures (501) selected may be L1 directed with parameters specific to walking scenario. When the output from motion classification is panning, the stabilization procedures (501) selected may be L1 directed with parameters optimal to panning, but different from walking.

Figure 11:
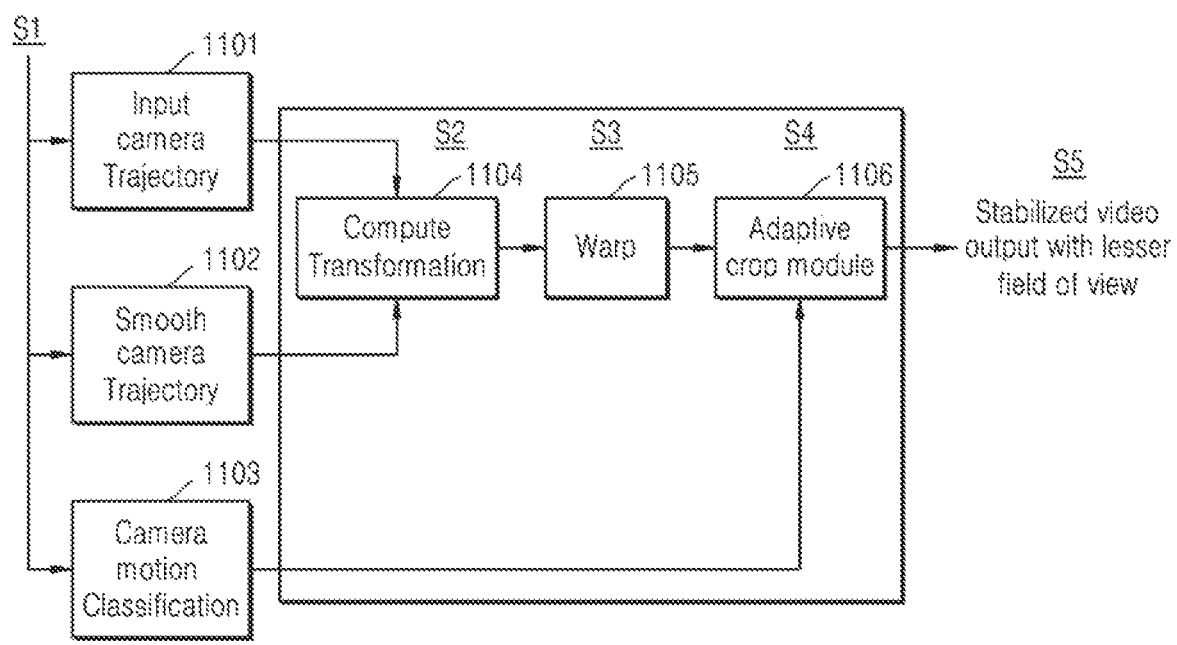
FIG. 11 is a block diagram illustrating motion compensation and crop module for full frame media stabilization, according to an embodiment of the disclosure.

FIG. 11 is a block diagram illustrating motion compensation and crop module for full frame media stabilization, according to an embodiment of the disclosure. Referring to FIG. 11 includes input camera trajectory (1101), smooth camera trajectory (1102), camera motion classification (1103), compute transformation (1104), warp (1105) and adaptive crop module (1106) to output the stabilized media output with lesser field of view (1107).

In one or more examples, the motion compensator (403) applies a difference of an original camera trajectory and a smooth camera trajectory (1102) on the input video frame. The motion transformation may be 2D or 3D based on motion estimation and path planning module. The input video frame may be warped to ensure the output video follows the virtual smooth camera trajectory (1102). The role of crop module is to remove empty regions from motion compensated video frame. The crop in the conventional method is fixed and may remove the valid regions and agnostic to motion type. In an embodiment, the amount of crop is advantageously determined based on the type of the motion and the variation in the type of motion. The crop module considers variable crop constraint from motion classification module that ensures unnecessary regions are not removed. For an instance, when the user is static during recording, then crop constraint is less that is less cropping is applied. In another instance, when the user is running during recording, crop constraint is high as camera smoothing is more aggressive.

The camera trajectory module determines the position of the camera and visual odometry. Estimating the position and orientation of the camera in the 3D environment based on the images the camera trajectory module. Distinctive features from consecutive images and the distinctive features are matched to estimate the camera motion. For achieving smooth trajectory in the image capturing, the methods such as smoothing filters, interpolation, motion planning, sensor fusion, and optimization may be used. The camera motion classification classifies the type of motion to determine the transformation of the media frames (103).

The motion transformation may be 2D or 3D based on motion estimation and path planning module. In one or more examples, the process of warping transforms or the distorted images to align with desired perspective or geometry. In one or more examples, geometric transformations may be applied to the image to correct for perspective distortions, align objects, or generate specific effects. The adaptive crop module (1106) may be used to determine the amount of crop to be used for the media frames (103). The amount of crop may be determined based on the type of motion. The adaptive crop module (1106) determines whether the type of motion is static motion, panning, harmonic or jitter. The stabilized video output with lesser field of view (S5) is outputted once the media frames (103) are cropped dynamically based on the type of motion and the complexity of motion. When the stabilized video is received based on the type of motion. For example, when the type of motion is static, then lower degree of crop is selected. When the type of motion is panning, moderate degree of crop is selected.

Figure 12:
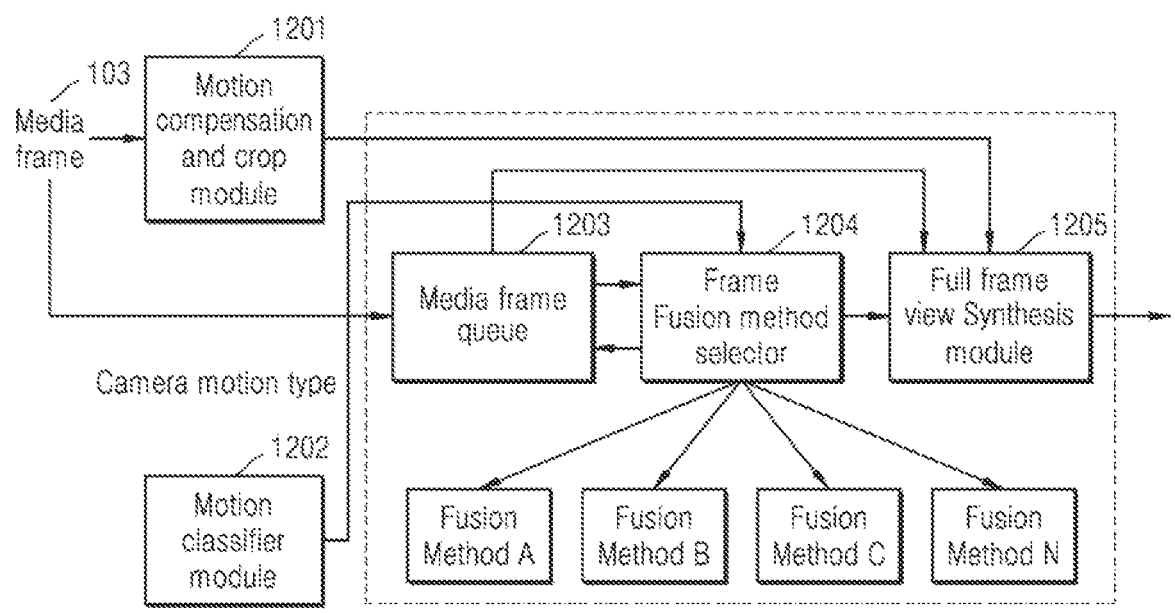
FIG. 12 is a block diagram illustrating frame fusion module for full frame media stabilization, according to an embodiment of the disclosure.

FIG. 12 is a block diagram illustrating frame fusion module for full frame media stabilization, according to an embodiment of the disclosure. The frame fusion is used to merge the historical media frames (103) and the future frames to obtain the stabilized frames without the crop constraints. The frame fusion module includes motion compensation and crop module (1201), motion classifier module (1202), media frame queue (1203), frame fusion method selector (1204), full frame view synthesis module (1205). The media frames (103) are provided as input to the motion compensation and crop module (1201). The media frames (103) are also given as input to the media frame queue (1203).

The frame fusion method selector (1204) is to restore the field of view in the stabilized cropped media frame. The frame fusion method selector (1204) or frame fusion procedure contains multiple in-painting or fusion methods for varying complexity motion. Based on the camera motion type, an appropriate frame fusion procedure is picked along with past and future frames for field of view completion. For example, when the type of motion is static, the frame fusion method selector (1204) selects the DNN fusion module A that needs 3 frames to perform view restoration. When the camera motion is not large, a number of frames needed to perform the full frame stabilization may be reduced.

In one or more examples, when the type of motion is running, the frame fusion module selects the DNN fusion model B that needs 7 frames to perform video restoration. The frame fusion model B is a complex model than the DNN fusion model B. The frame fusion model B is an appropriate selection for this example, as a running motion state needs more frames to perform view restoration, since temporal coherency is lesser than static state.

The motion compensation and crop module (1201) determines the crop constraints based on the type of motion. The motion estimation module (106) determines the type of motion using the media frames (103) and the motion sensor (1803). Based on the type of motion, the stabilization procedures (501) may be determined. The crop constraints are determined based on the type of motion and the media frames (103) are stabilized using the stabilization procedures (501). The motion classifier determines the type of motion to determine the stabilization procedures (501). The motion classifier module (1202) determines the type of motion and transmits to the media frame queue. The video frame queue stores the media frames (103) for performing the frame fusion. The frame fusion method selector selects the frame fusion procedure based on the received media frames (103). Referring to FIG. 12, any one of the fusion method A, fusion method B, and fusion method C to fusion method N may be selected. In one or more examples, the frame fusion method selector selects the fusion method based on the crop constraints received and the type of motion of the media frames (103). The full frame view synthesis module (1205) selects the media frames (103) to be used for fusion method. More than one media frame is merged based on the fusion procedure selected to receive the stabilized full frames. The level of crop for the stabilization is determined based on the type of motion. The media frames (103) are cropped to a pre-determined size based on the complexity level of the motion. In one or more examples, the frame fusion procedure is selected based on the type of motion of the electronic device (100).

Figure 13:
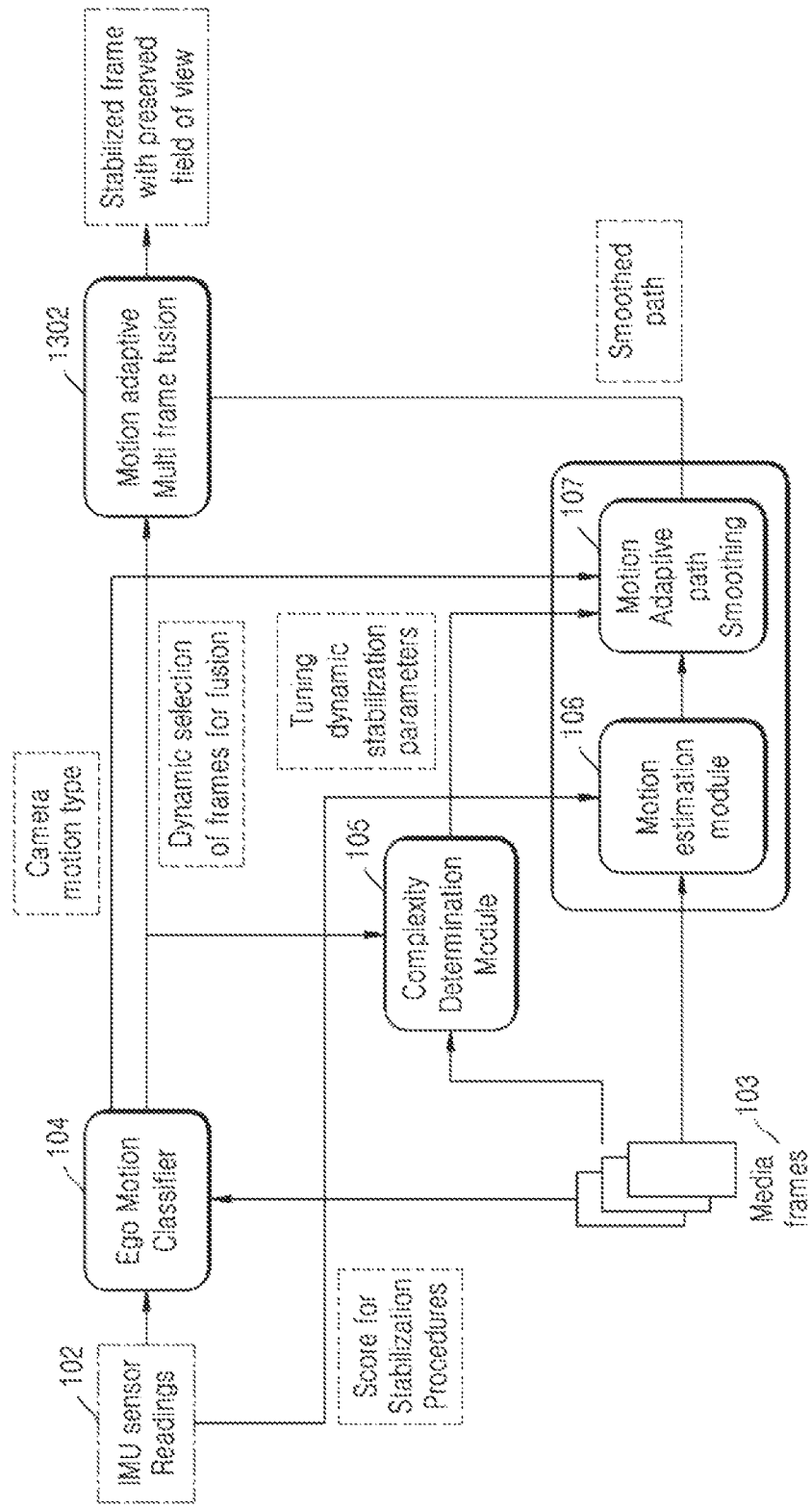
FIG. 13 is a block diagram illustrating full frame media stabilization using ego motion classifier, according to an embodiment of the disclosure.

FIG. 13 is a block diagram illustrating full frame media stabilization using ego motion classifier (104), according to an embodiment of the disclosure. The full frame media stabilization includes IMU sensor readings, ego motion classifier (104), complexity determination module (105), motion estimation module (106), motion adaptive path smoothing module (107), and motion adaptive dynamic multi-frame fusion module (108).

In one or more examples, the IMU sensors (102) are a combination of multiple sensors such as, but not limited to, accelerometer, gyroscope, and magnetometer. The sensors measure and report the information about object's orientation, acceleration, and magnetic field strength, or any other suitable information pertaining to the object. The ego motion classifier (104) receives the input from the IMU sensor (102) and the vision-based motion analysis module (101). The vision-based motion analysis module (101) collects the media frames (103). The media frames (103) are analyzed to determine the type of motion in the media frames (103). The type of motion determined using the vision-based motion analysis module (101). Based on the IMU sensor readings and vision-based features, ego motion classifier (104) outputs a motion type at a given instance. The motion type may be, but not limited to static (handheld and tripod), panning (slow, fast), user motion types like walking (slow, fast), running, high frequency motion types such as quick shake. Based on the type of motion and variation in the type of motion obtained from vision analysis of media frames (103), complexity determination module (105) outputs scores for every video stabilization procedure (501).

The motion estimation module (106) determines the transformation between the successive media frames (103). The input to motion estimation module (106) may be media frames (103), aligned IMU sensor readings or may be both media frames (103) and aligned IMU sensor readings. The IMU sensor readings may include camera motion type. The motion estimation determination module (105) receives the scores of stabilization procedures (501) to determine the complexity level of the media frames (103) to select the stabilization procedures (501). The output of the motion estimation is 2D or 3D transformation between successive frames. The output of motion estimation is used for computing 2D or 3D camera trajectory that is smoothened to obtain stable media frames (103).

The motion adaptive path smoothing module (107) receives the input from the complexity determination module (105), ego motion classifier (104), and the motion estimation module (106). The motion adaptive path smoothing module (107) may select the stabilization procedures (501) and frame fusion procedure dynamically based on the variation in the type of motion. The motion adaptive path smoothing module (107) obtains the possible smooth trajectory using original camera trajectory obtained from motion estimation. The motion adaptive path smoothing module (107) includes multiple methods for smoothing the media frames (103) with different behavior based on the type of detected motion. The complexity determination module provides the scores for different smoothing methods depending on the type of motion and the complexity level of the motion. Based on the scores, the smoothing method is selected. Based on the motion type, the smoothing method is used and the associated hyper parameter is selected. The path smoothing method is and the tuned parameter are used to smoothen the input camera trajectory. The path smoothing is performed and smooth path free of unwanted jitter is obtained. Upon constrained application, the smooth path on the input video frames is received with stable frames. Each pixel of the stable frames follows the smooth path.

In an embodiment, based on the motion classifier output and scores for various stabilization procedures (501) obtained from complexity determination module, path smoothing method and the parameters for the smoothing method are determined. For example, L1 directed method, weights, crop constraints are selected. The motion compensation and dynamic crop is applied for determining the motion adaptive multi-frame fusion. For frame fusion, appropriate fusion method and the number of frames are chosen based on the current camera motion type. The view synthesis is carried out using cropped stabilized frame along with past and future frames to obtain smooth full-frame video stabilization output.

Figure 14:
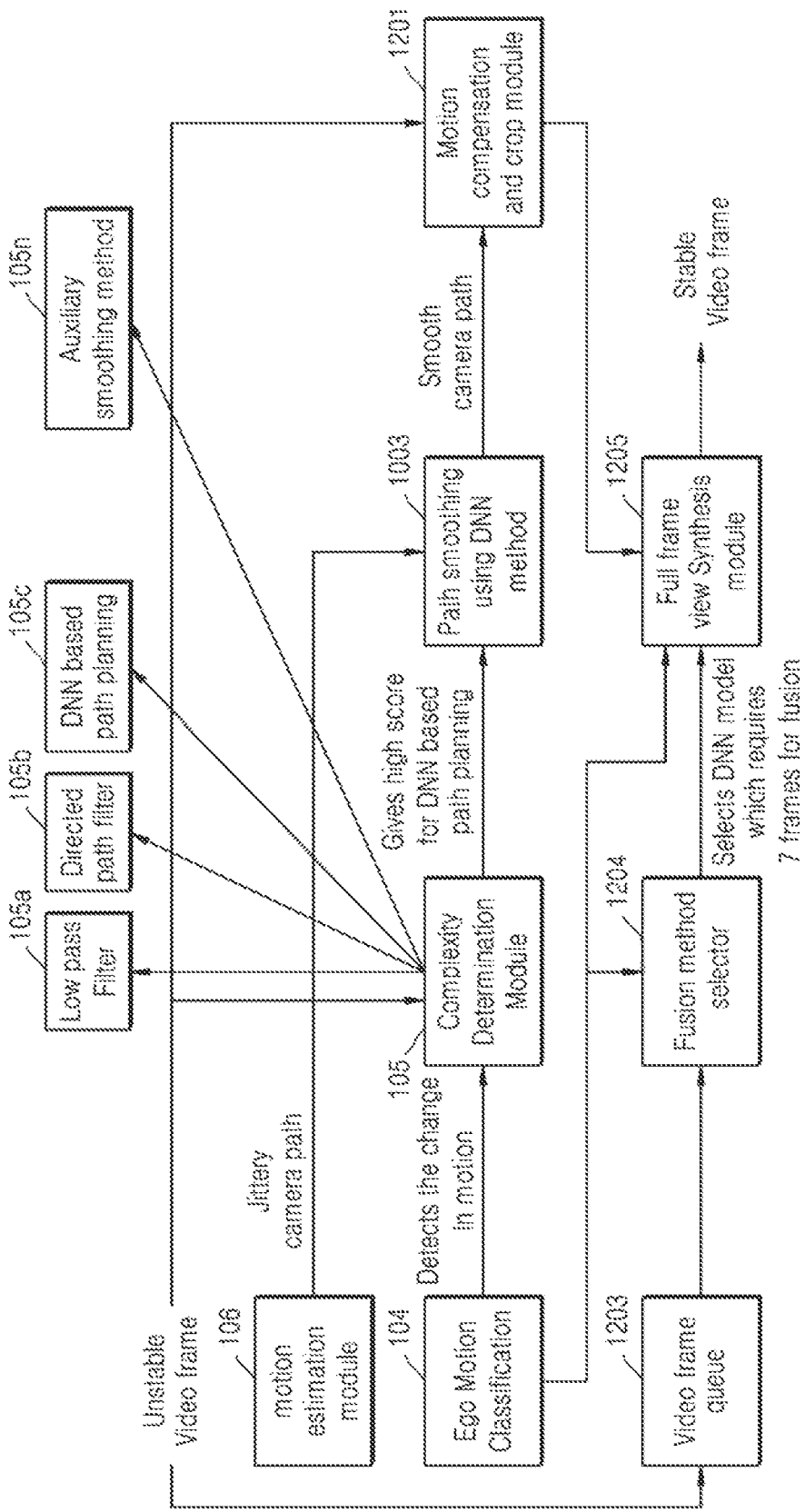
FIG. 14 is a block diagram illustrating a use case for variation in type of motion for full frame media stabilization, according to an embodiment of the disclosure.

FIG. 14 is a block diagram illustrating a use case for variation in type of motion for full frame media stabilization, according to an embodiment of the disclosure. Referring to FIG. 14, the use case may be, for example, running of the user while capturing the media frames (103). In feature running, the variations in the type of motion may be higher. The complexity determination module assigns a high score for the DNN bases oath planning, since the complex path planning method is required for smoothing camera path in the use case. The frame fusion module selects the complex method or frame fusion procedure that need 7 frames to perform the view restoration.

In one or more examples, the block diagram of FIG. 14 includes, motion estimation module (106), ego motion classification (104), media frame queue (1203), complexity determination module (105), frame fusion method selector (1204), path smoothing using DNN method (1003), full frame view synthesis module (1205), motion compensation and crop module (1201). The complexity determination module (105) includes low pass filter (105a), directed path filter (105b), DNN based path planning (105c) and auxiliary smoothing method.

An unstable media frame is given as input to the complexity determination module and the video frame queue. The complexity determination module considers the motion of the camera of the electronic device (100) and ego motion classification as input to perform path smoothing. The complexity determination module uses different methods such as low pass filter, directed path filter, DNN based path planning, auxiliary smoothing method, or any other suitable method known to one of ordinary skill in the art. The motion estimation module (106) determines the type of motion of the media frames (103) captured from the camera of the electronic device (100). The ego motion classifier (104) determines the variation in the type of motion. The complexity determination module uses one of the methods of the multiple methods based on the scores assigned to the media frames (103). In the running use case, the complexity determination module assigns high score for the media frames (103). The methods or the procedures referred in the document may be the stabilization procedures (501). The path smoothing is performed using DNN method (1003) based on the complexity level. The motion compensation and crop module (1201) smoothen the camera path considering the path smoothing using DNN method and the unstable media frame.

In an embodiment, the video frame queue receives the unstable media frames (103) and stores in the media frame queue (1203). The frame fusion method selector (1204) selects the method for merging the media frames (103) or the number of frames to be merged to retrieve the full frame media. The frame fusion method selector (1204) may include multiple fusion method or frame fusion procedures. The DNN model require 7 frames for fusion of the media frames (103). The frame fusion procedure is selected based on the media frames (103) and the output form the ego motion classifier (104).

Figure 15:
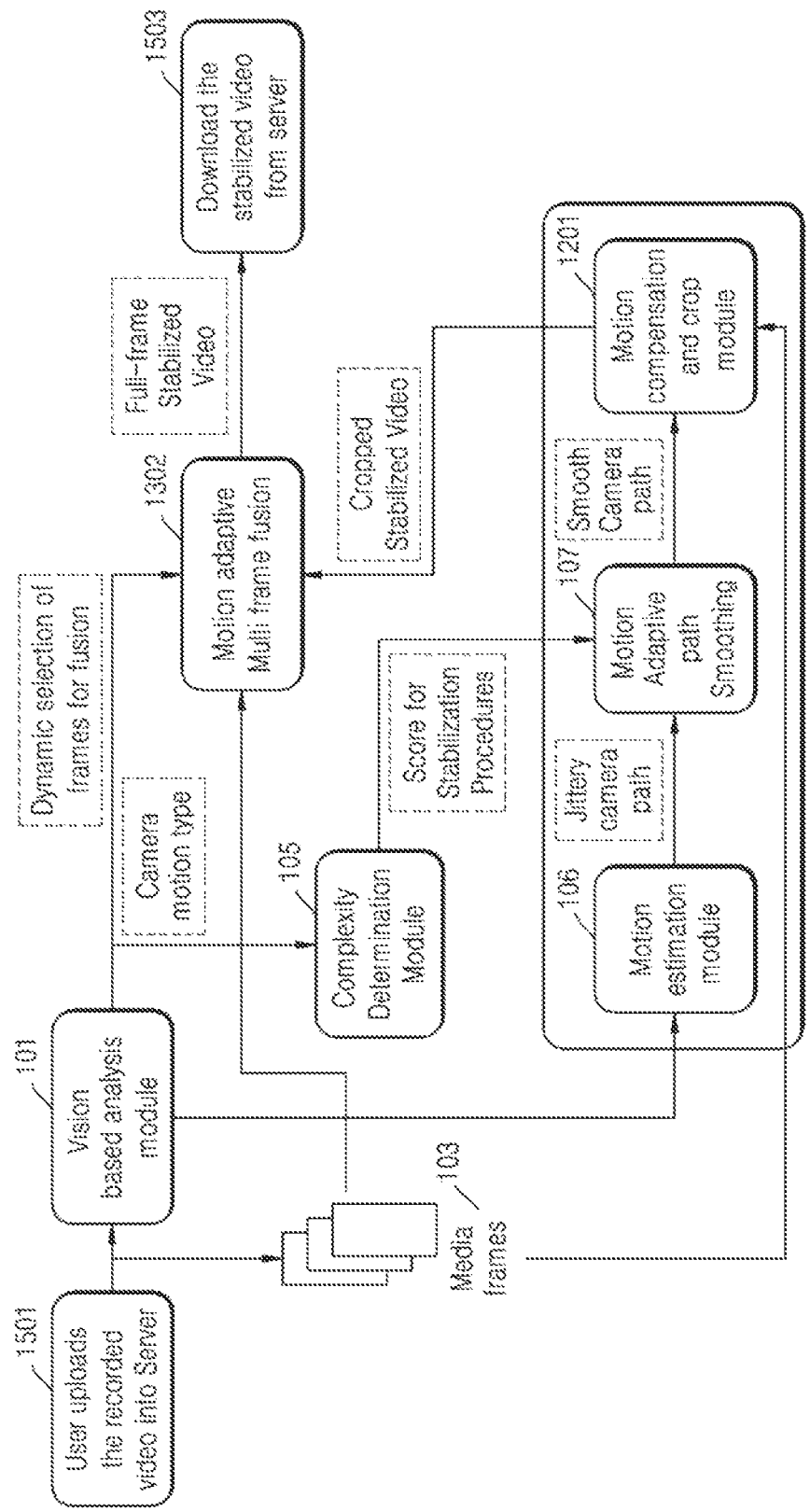
FIG. 15 is a block diagram illustrating a use case for vision based analysis for the media frames for full frame media stabilization, according to an embodiment of the disclosure.

FIG. 15 is a block diagram illustrating a use case for the vision-based motion analysis module (101) for the media frames (103) for full frame media stabilization, according to an embodiment of the disclosure. The ego motion classification is performed using vision-based method. The unstable camera path for the uploaded video is also obtained using vision-based analysis in the vision-based motion analysis module (101). The block diagram includes, complexity determination module (105), vision-based motion analysis module (101), motion estimation module (106), motion adaptive path smoothing module (107), motion compensation and crop module (1201), and motion adaptive multi-frame fusion (1302).

In an embodiment, the user uploads the recorded video into the server (1501). The media frames (103) are stored in a memory (1801) of the electronic device (100). Vision based analysis is performed on the recorded media frames (103). The ego motion classification is performed using the vision-based methods, as only the recorded media frames (103) are available. The unstable camera path for the uploaded media is obtained using vision-based motion analysis module (101). The complexity determination module (105) determines the score for selecting stabilization procedures (501). The complexity determination module (105) receives the type of motion of the media frames (103) captured using camera. The motion adaptive path smoothing determines the stabilization procedures (501) to be used to stabilize the media frames (103) using the scores assigned in the complexity determination module (105). The motion adaptive path smoothing module (107) considers the motion estimation module output (106). The output of the motion estimation module determines the jittery camera path. The motion adaptive path smoothing module (107) dynamically determines the type of motion and the variation in the type of motion. The motion adaptive multi-frame fusion module receives the input of multiple media frames (103). The cropped stabilized media frames (103) are generated from the motion adaptive path smoothing module (107) and the output of the cropped stabilized media frames (103) are transmitted to the motion adaptive multi-frame fusion module (1302). The frame fusion procedure is dynamically selected based on the media frames (103) and the level of crop. The full-frame stabilized media frames (103) are outputted for downloading (1503).

Figure 16:
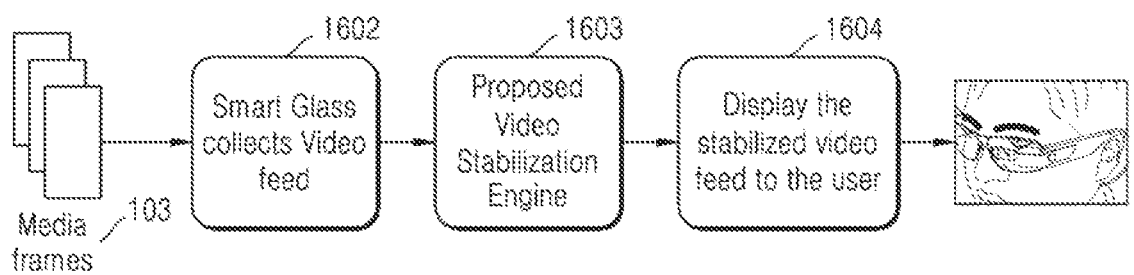
FIG. 16 is a block diagram illustrating a use case for media stabilization for wearable devices for full frame media stabilization, according to an embodiment of the disclosure.

FIG. 16 is a block diagram illustrating a use case for media stabilization for wearable devices for full frame media stabilization, according to an embodiment of the disclosure. The block diagram includes media frames (103), smart glass collects media frames (1602), proposed media stabilization engine (1603), display the stabilized media frames (1604) to the user. The media frames (103) are given as input to the smart glass (1602). The collected media frames (103) are stabilized using an embodiment of the disclosure using the stabilization engine (1603). The stabilized media frames (103) are displayed on the video feed to the user.

The stabilization engine (1603) collects the media frames (103) from the electronic device (100). The media frames (103) are stabilized and once the stabilized full frame media frames (103) are obtained, then the stabilized media frames (103) are transmitted to the smart glass (1602). The smart glass may display the stabilized full frame media frames (103).

Figure 17:
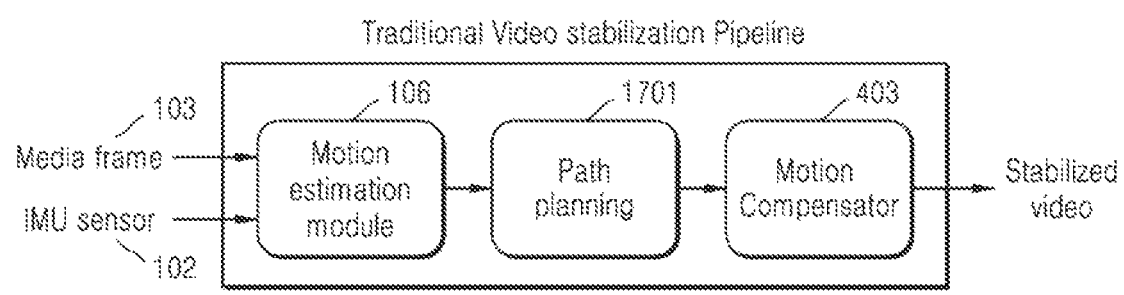
FIG. 17 is a block diagram illustrating video stabilization pipeline.

FIG. 17 is a block diagram illustrating video stabilization pipeline. The block includes motion estimation module (106), path planning (1701) and motion compensator (403). The motion estimation module (106) receives the input from the IMU sensor (102) and the media frames (103). The motion estimation module (106) determines the type of motion and the variation in the type of motion using the IMU sensor (102). The complexity determination module (105) may be adapted to determine complexity determination method depending on the use case in smart glasses, reducing time taken to display the stabilized feed. The present disclosure may provide the stable media in real time and also avoid virtual reality sickness or nausea for the users viewing the video feed. The present disclosure removes lag in viewing high-quality video.

The path planning (1701) includes collecting the type of motion and the variation in the type of motion. The ego motion classification is provided to adaptive path planning (1701) to choose or adjust path smoothing method based on motion type. The motion adaptive path planning (1701) obtains the smooth trajectory using the original camera trajectory. The path smoothing method selected with the selected tuned parameter is used to smoothen the input camera trajectory.

In an embodiment, the video stabilization method advantageously generates pleasing videos by removing undesirable camera motion. Most of the videos on the smartphone are captured handheld in various static and dynamic modes. Therefore, videos captured by a smartphone are prone to jitters causing unpleasant viewing experience. Video stabilization methods may include motion estimation, motion smoothing (402), and motion compensation. The existing methods use input frames and readings from IMU sensors (102) to estimate camera motion followed by methods to smoothen the camera motion path. Motion compensation is applied to accommodate a difference between an original path and a smooth path. Finally, motion compensated video frame is cropped to remove blank regions created due to motion compensation. Since video stabilization is an integral part of camera pipeline in our smartphones, poorer stabilization and excessive crop may reduce the end user experience. Through the disclosure, the system and method for full frame media stabilization that uses prior motion information for adaptive path smoothing and dynamic frame fusion for improved field of view. Camera motion is estimated with help of vision-based motion analysis module (101) or IMU sensors (102).

The estimated motion is smoothened through a gamut of methods ranging from simple low pass filter to directed motion flow. The path smoothing method is tuned with hyper parameters that determines extend of smoothing. The hyper parameters are very critical to performance of video stabilization. For example, one set of parameters may be optimal for hand held static recording and other set might be optimal for hand held recording while walking. Since, all motion smoothing methods are not designed to use prior motion information, a common set of hyper parameters are usually used in deployment that provides a balanced performance across majority of video recording scenarios. However, this limits the performance of video stabilization engine and stabilization quality is not optimal in many cases. Motion compensation applies the difference in original camera and smoothed camera path on to video frame through frame warping. The motion compensation creates a stable video, but also produces blank regions in the output video frame. To address blank space issue, video is cropped and resized, reducing the original field of view of camera. The amount to be cropped is a hyper parameter in video stabilization method and is usually fixed irrespective of camera motion.

Figure 18:
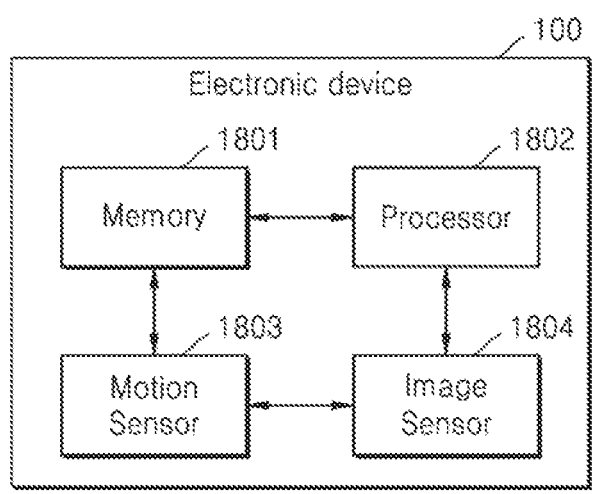
FIG. 18 is a block diagram illustrating an electronic device for full frame media stabilization, according to an embodiment of the disclosure.

FIG. 18 is a block diagram illustrating an electronic device (100) for full frame media stabilization, according to an embodiment of the disclosure. The block diagram includes a memory (1801), a processor (1802), a motion sensor (1803), and an image sensor (1804).

The memory (1801) includes storage locations to be addressable through the processor (1802). The memory (1801) is not limited to a volatile memory and/or a non-volatile memory. Further, the memory (1801) may include one or more computer-readable storage media. The memory (1801) may include non-volatile storage elements. For example, non-volatile storage elements may include magnetic hard discs, optical discs, floppy discs, flash memories, or forms of electrically programmable memories (EPROM) or electrically erasable and programmable (EEPROM) memories. The memory (1801) may store the media frames (103) such as historical frames, recorded videos and the like.

The processor (1802) communicates with the memory (1801), the motion sensor (1803), and the image sensor (1804). The processor (1802) is configured to execute one or more instructions stored in the memory (1801) and to perform various processes. The processor (1802) may include one or a plurality of processors, and may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The processor (1802) receives the output from the motion sensors (1803) such as IMU sensor (102). The processor (1802) determines the type of motion and the variation in the type of motion of the media frames (103) using the motion of the camera as well as the vision-based motion analysis module (101). The image sensor (1804) is a device that captures and converts light into an electronic signal that may then be processed and used to create digital images. The image sensors (1804) are a fundamental component such as digital cameras, smartphones, and many other imaging devices.

Figure 19:
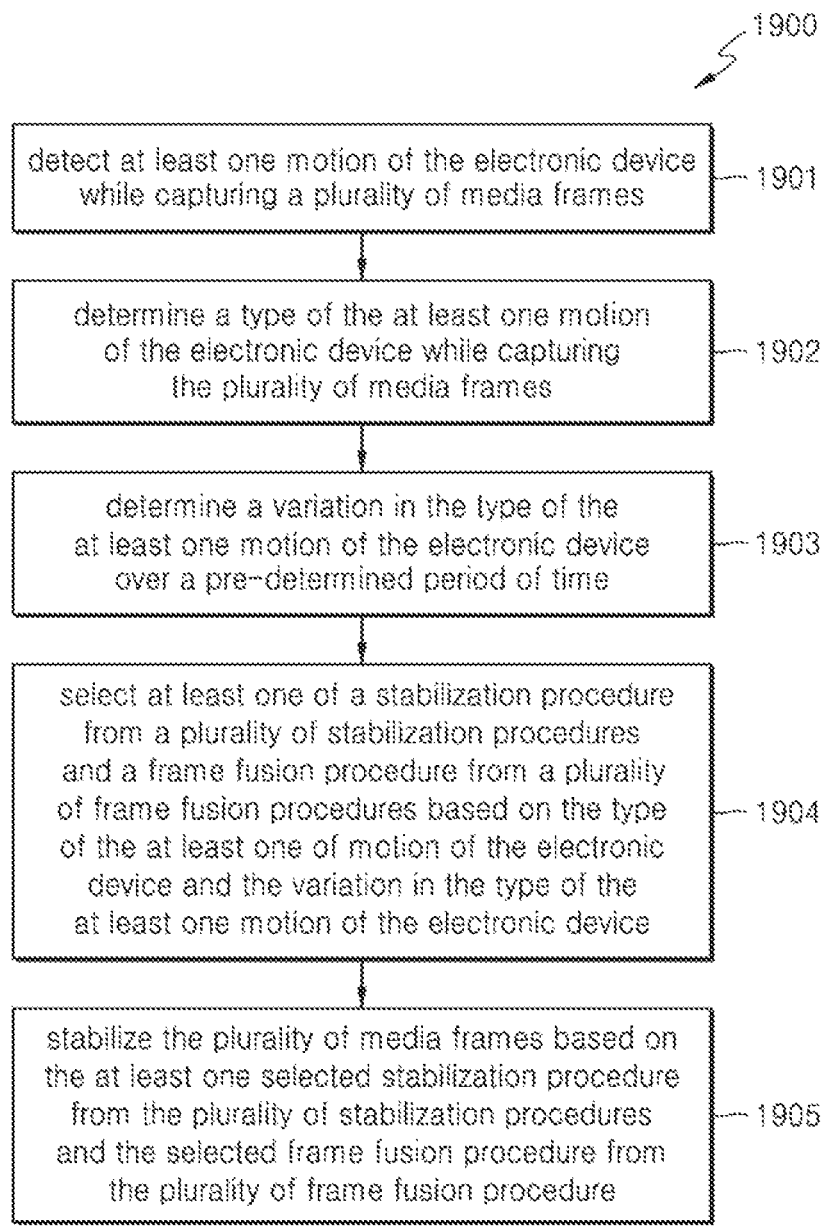
FIG. 19 is a flow diagram illustrating an electronic device for full frame media stabilization, according to an embodiment of the disclosure.

FIG. 19 is a flow diagram illustrating an electronic device (100) for full frame media stabilization, according to an embodiment of the disclosure.

In operation 1901, motion of the electronic device (100) is detected while capturing the media frames (103). The media frames (103) are captured using the image sensor (1804) of the electronic device (100).

In operation 1902, the type of the motion of the electronic device (100) is determined while capturing the media frames (103).

In operation 1903, the variation in the type of the motion is determined over a pre-determined period of time.

In operation 1904, the stabilization procedure (501) and the frame fusion procedure are selected based on the type of the motion of the electronic device (100).

In operation 1905, the media frames (103) are stabilized based on the selected stabilization procedure (501) and the selected frame fusion procedure.

According to an embodiment of the disclosure, a method for full frame media stabilization may comprise detecting at least one motion of the electronic device (100) while capturing a plurality of media frames (103).

In an embodiment, the method may comprise determining a type of the at least one motion of the electronic device (100) while capturing the plurality of media frames (103).

In an embodiment, the method may comprise determining a variation in the type of the at least one motion of the electronic device (100) over a pre-determined period of time.

In an embodiment, the method may comprise selecting at least one stabilization procedure from a plurality of stabilization procedures and a frame fusion procedure from a plurality of frame fusion procedures based on the type of the at least one motion of the electronic device (100) and the variation in the type of the at least one motion of the electronic device (100).

In an embodiment, the method may comprise stabilizing, after the capturing of the plurality of media frames (103), the plurality of media frames (103) based on the at least one selected stabilization procedure from the plurality of stabilization procedures and the selected frame fusion procedure from the plurality of frame fusion procedures.

In an embodiment, the selecting the at least one stabilization procedure and the frame fusion procedure based on the type of the at least one motion and the variation in the type of the at least one motion may comprise: determining a complexity level of the at least one motion based on at least one stabilization parameter, the type of the at least one motion, and the variation in the type of the at least one motion, and selecting the at least one stabilization procedure based on the complexity level of the at least one motion.

In an embodiment, the stabilizing the plurality of media frames (103) based on the at least one selected stabilization procedure and the selected frame fusion procedure, may comprise: stabilizing at least one media frame of the plurality of media frames (103) based on the at least one selected stabilization procedure, and determining the full frame media stabilization using the selected frame fusion procedure for the at least one stabilized media frame.

In an embodiment, the at least one stabilization parameter may comprise at least one of a power consumed for stabilization of the plurality of media frames (103) by each of the plurality of stabilization procedures, a time taken for stabilization of the plurality of media frames (103) by each of the plurality of stabilization procedures, and a correlation between each of the plurality of media frames (103) and each of the plurality of stabilization procedures.

In an embodiment, the type of the at least one motion may be determined based on an analysis of one or more objects included in the plurality of media frames (103) and a motion sensor (1803).

In an embodiment, the stabilizing the plurality of media frames (103) based on the at least one selected stabilization procedure and the selected frame fusion procedure may comprise: determining one or more crop parameters for the stabilizing the plurality of media frames based on the complexity level of the at least one motion of the electronic device (100), and cropping a pre-determined size of at least one media frame of the plurality of media frames (103) based on the determined one or more crop parameters.

In an embodiment, the frame fusion procedure may comprise: receiving the type of the at least one motion of the electronic device (100), selecting at least one fusion procedure from the plurality of fusion procedure based on the type of the at least one motion, wherein selecting the fusion procedure comprises selecting the plurality of media frames (103), receiving stabilized frame from a path smoothing component, restoring the at least one media frame of the plurality of media frames (103) based on the at least one fusion procedure selected using the plurality of media frames (103), and fusing the plurality of media frames (103) based on the type of the at least one motion and variation dynamically.

In an embodiment, the determining the type of the at least one motion may comprise: receiving, from a motion sensor (1803), a plurality of motions of the electronic device (100), determining the type of the at least one motion using at least one motion estimation method and the received plurality of motions of the electronic device (100), and classifying the type of the at least one motion based on an output of the at least one motion estimation method.

According to an embodiment of the disclosure, an electronic device (100) for full frame media stabilization may comprise a memory (1801), at least one processor (1802), a motion sensor (1803) configured to detect at least one motion of the electronic device (100) while capturing a plurality of media frames (103), and at least one image sensor (1804) configured to capture the plurality of media frames (103).

In an embodiment, the at least one processor (1802) may determine a type of the at least one motion of the electronic device (100) while capturing the plurality of media frames (103).

In an embodiment, the at least one processor (1802) may determine a variation in the type of the at least one motion of the electronic device (100) over a pre-determined period of time.

In an embodiment, the at least one processor (1802) may select at least one stabilization procedure from a plurality of stabilization procedures and a frame fusion procedure from a plurality of frame fusion procedures based on the type of the at least one motion of the electronic device (100) and the variation in the type of the at least one motion of the electronic device (100).

In an embodiment, the at least one processor (1802) may stabilize, after the capture of the plurality of media frames (103), the plurality of media frames (103) based on the at least one selected stabilization procedure from the plurality of stabilization procedures and the selected frame fusion procedure from the plurality of frame fusion procedures.

In an embodiment, to select the at least one stabilization procedure and the frame fusion procedure based on the type of the at least one motion and the variation in the type of the at least one motion, the at least one processor (1802) may be configured to: determine a complexity level of the at least one motion based on at least one stabilization parameter, the type of the at least one motion, and the variation in the type of the at least one motion, and select the at least one stabilization procedure based on the complexity level of the at least one motion.

In an embodiment, to stabilize the plurality of media frames (103) based on the at least one selected stabilization procedure and the selected frame fusion procedure, the at least one processor (1802) may be configured to: stabilize at least one media frame of the plurality of media frames (103) based on the at least one selected stabilization procedure, and determine the full frame media stabilization using the selected frame fusion procedure for the at least one stabilized media frame.

In an embodiment, the at least one stabilization parameter may comprise at least one of a power consumed for stabilization of the plurality of media frames (103) by each of the plurality of stabilization procedures, a time taken for stabilization of the plurality of media frames (103) by each of the plurality of stabilization procedures, and a correlation between each of the plurality of media frames (103) and each of the plurality of stabilization procedures.

In an embodiment, the type of the at least one motion may be determined based on an analysis of one or more objects included in the plurality of media frames (103) and a motion sensor (1803).

In an embodiment, to stabilize the plurality of media frames (103) based on the at least one selected stabilization procedure and the selected frame fusion procedure, the at least one processor (1802) may be configured to: determine one or more crop parameters for the stabilizing the plurality of media frames based on the complexity level of the at least one motion of the electronic device (100), and crop a pre-determined size of at least one media frame of the plurality of media frames (103) based on the determined one or more crop parameters.

In an embodiment, the frame fusion procedure comprises: receiving the type of the least one motion of the at least one motion of the electronic device (100), selecting at least one fusion procedure from the plurality of fusion procedure based on the type of the at least one motion, wherein selecting the fusion procedure comprises selecting the plurality of media frames (103), receiving stabilized frame from a path smoothing component, restoring the at least one media frame of the plurality of media frames (103) based on the at least one fusion procedure selected using the plurality of media frames (103), and fusing the plurality of media frames (103) based on the type of the at least one motion and variation dynamically.

In an embodiment, to determine the type of the at least one motion, the at least one processor (1802) may be configured to: receive a plurality of motions of the electronic device (100), determine the type of the at least one motion using at least one motion estimation method and the received plurality of motions of the electronic device (100), and classify the type of the at least one motion based on an output of the at least one motion estimation method.

The foregoing description of the specific embodiments will so fully reveal the general nature of the embodiments herein that others may by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

What is claimed:

1. A method for full frame media stabilization, the method performed by an electronic device, the method comprising:
    detecting at least one motion of the electronic device while capturing a plurality of media frames;
    determining a type of the at least one motion of the electronic device while capturing the plurality of media frames;
    determining a variation in the type of the at least one motion of the electronic device over a pre-determined period of time;
    selecting at least one stabilization procedure from a plurality of stabilization procedures and a frame fusion procedure from a plurality of frame fusion procedures based on the type of the at least one motion of the electronic device and the variation in the type of the at least one motion of the electronic device; and stabilizing, after the capturing of the plurality of media frames, the plurality of media frames based on the at least one selected stabilization procedure from the plurality of stabilization procedures and the selected frame fusion procedure from the plurality of frame fusion procedures.

2. The method of claim 1, wherein the selecting the at least one stabilization procedure and the frame fusion procedure based on the type of the at least one motion and the variation in the type of the at least one motion comprises:
determining a complexity level of the at least one motion based on at least one stabilization parameter, the type of the at least one motion, and the variation in the type of the at least one motion; and
selecting the at least one stabilization procedure based on the complexity level of the at least one motion.

3. The method of claim 1, wherein the stabilizing the plurality of media frames based on the at least one selected stabilization procedure and the selected frame fusion procedure, comprises:
stabilizing at least one media frame of the plurality of media frames based on the at least one selected stabilization procedure; and
determining the full frame media stabilization using the selected frame fusion procedure for the at least one stabilized media frame.

4. The method of claim 2, wherein the at least one stabilization parameter comprises at least one of a power consumed for stabilization of the plurality of media frames by each of the plurality of stabilization procedures, a time taken for stabilization of the plurality of media frames by each of the plurality of stabilization procedures, and a correlation between each of the plurality of media frames and each of the plurality of stabilization procedures.

5. The method of claim 1, wherein the type of the at least one motion is determined based on an analysis of one or more objects included in the plurality of media frames and a motion sensor.

6. The method of claim 2, wherein the stabilizing the plurality of media frames based on the at least one selected stabilization procedure and the selected frame fusion procedure comprises:
determining one or more crop parameters for the stabilizing the plurality of media frames based on the complexity level of the at least one motion of the electronic device; and
cropping a pre-determined size of at least one media frame of the plurality of media frames based on the determined one or more crop parameters.

7. The method of claim 2, wherein the frame fusion procedure comprises:
receiving the type of the at least one motion of the electronic device;
selecting at least one fusion procedure from the plurality of fusion procedure based on the type of the at least one motion, wherein selecting the fusion procedure comprises selecting the plurality of media frames;
receiving stabilized frame from a path smoothing component;
restoring the at least one media frame of the plurality of media frames based on the at least one fusion procedure selected using the plurality of media frames; and
fusing the plurality of media frames based on the type of the at least one motion and variation dynamically.

8. The method of claim 1, wherein the determining the type of the at least one motion comprises:
receiving, from a motion sensor, a plurality of motions of the electronic device;
determining the type of the at least one motion using at least one motion estimation method and the received plurality of motions of the electronic device; and
classifying the type of the at least one motion based on an output of the at least one motion estimation method.

9. An electronic device for full frame media stabilization, the electronic device comprising:
a memory;
at least one processor;
a motion sensor configured to detect at least one motion of the electronic device while capturing a plurality of media frames; and
at least one image sensor configured to capture the plurality of media frames,
wherein the at least one processor is configured to;
determine a type of the at least one motion of the electronic device while capturing the plurality of media frames;
determine a variation in the type of the at least one motion of the electronic device over a pre-determined period of time;
select at least one stabilization procedure from a plurality of stabilization procedures and a frame fusion procedure from a plurality of frame fusion procedures based on the type of the at least one motion of the electronic device and the variation in the type of the at least one motion of the electronic device; and
stabilize, after the capture of the plurality of media frames, the plurality of media frames based on the at least one selected stabilization procedure from the plurality of stabilization procedures and the selected frame fusion procedure from the plurality of frame fusion procedures.

10. The electronic device of claim 9, wherein, to select the at least one stabilization procedure and the frame fusion procedure based on the type of the at least one motion and the variation in the type of the at least one motion, the at least one processor is configured to:
determine a complexity level of the at least one motion based on at least one stabilization parameter, the type of the at least one motion, and the variation in the type of the at least one motion; and
select the at least one stabilization procedure based on the complexity level of the at least one motion.

11. The electronic device of claim 9, wherein, to stabilize the plurality of media frames based on the at least one selected stabilization procedure and the selected frame fusion procedure, the at least one processor is configured to:
stabilize at least one media frame of the plurality of media frames based on the at least one selected stabilization procedure; and
determine the full frame media stabilization using the selected frame fusion procedure for the at least one stabilized media frame.

12. The electronic device of claim 10, wherein the at least one stabilization parameter comprises at least one of a power consumed for stabilization of the plurality of media frames by each of the plurality of stabilization procedures, a time taken for stabilization of the plurality of media frames by each of the plurality of stabilization procedures, and a correlation between each of the plurality of media frames and each of the plurality of stabilization procedures.

13. The electronic device of claim 9, wherein the type of the at least one motion is determined based on an analysis of one or more objects included in the plurality of media frames and a motion sensor.

14. The electronic device of claim 10, wherein, to stabilize the plurality of media frames based on the at least one selected stabilization procedure and the selected frame fusion procedure, the at least one processor is configured to:
determine one or more crop parameters for the stabilizing the plurality of media frames based on the complexity level of the at least one motion of the electronic device; and
crop a pre-determined size of at least one media frame of the plurality of media frames based on the determined one or more crop parameters.

15. The electronic device of claim 10, wherein the frame fusion procedure comprises:
receiving the type of the least one motion of the at least one motion of the electronic device;
selecting at least one fusion procedure from the plurality of fusion procedure based on the type of the at least one motion, wherein selecting the fusion procedure comprises selecting the plurality of media frames;
receiving stabilized frame from a path smoothing component;
restoring the at least one media frame of the plurality of media frames based on the at least one fusion procedure selected using the plurality of media frames; and
fusing the plurality of media frames based on the type of the at least one motion and variation dynamically.

16. The electronic device of claim 9, wherein, to determine the type of the at least one motion, the at least one processor is configured to:
receive a plurality of motions of the electronic device;
determine the type of the at least one motion using at least one motion estimation method and the received plurality of motions of the electronic device; and
classify the type of the at least one motion based on an output of the at least one motion estimation method.

17. A computer-readable storage media storing a program that, when executed by at least one processor of an electronic device, causes the electronic device to perform a method comprising:
detecting at least one motion of the electronic device while capturing a plurality of media frames;
determining a type of the at least one motion of the electronic device while capturing the plurality of media frames;
determining a variation in the type of the at least one motion of the electronic device over a pre-determined period of time;
selecting at least one stabilization procedure from a plurality of stabilization procedures and a frame fusion procedure from a plurality of frame fusion procedures based on the type of the at least one motion of the electronic device and the variation in the type of the at least one motion of the electronic device; and
stabilizing, after the capturing of the plurality of media frames, the plurality of media frames based on the at least one selected stabilization procedure from the plurality of stabilization procedures and the selected frame fusion procedure from the plurality of frame fusion procedures.

18. The computer-readable storage media of claim 17, wherein the selecting the at least one stabilization procedure and the frame fusion procedure based on the type of the at least one motion and the variation in the type of the at least one motion comprises:
determining a complexity level of the at least one motion based on at least one stabilization parameter, the type of the at least one motion, and the variation in the type of the at least one motion; and
selecting the at least one stabilization procedure based on the complexity level of the at least one motion.

19. The computer-readable storage media of claim 17, wherein the stabilizing the plurality of media frames based on the at least one selected stabilization procedure and the selected frame fusion procedure, comprises:
stabilizing at least one media frame of the plurality of media frames based on the at least one selected stabilization procedure; and
determining the full frame media stabilization using the selected frame fusion procedure for the at least one stabilized media frame.

20. The computer-readable storage media of claim 18, wherein the at least one stabilization parameter comprises at least one of a power consumed for stabilization of the plurality of media frames by each of the plurality of stabilization procedures, a time taken for stabilization of the plurality of media frames by each of the plurality of stabilization procedures, and a correlation between each of the plurality of media frames and each of the plurality of stabilization procedures.

* * * * *